United States Patent [19]
Seki et al.

[11] Patent Number: 5,998,647
[45] Date of Patent: Dec. 7, 1999

[54] METHANE ADSORBING-RETAINING AGENT AND THE USE THEREOF IN A METHOD FOR GAS STORAGE

[75] Inventors: Kenji Seki, Higashiosaka; Masataka Fujiwara, Sakai; Wasuke Mori, Kawanishi; Satoshi Takamizawa, Ikeda, all of Japan

[73] Assignee: Osaka Gas Co., Ltd., Japan

[21] Appl. No.: 09/109,422

[22] Filed: Jul. 2, 1998

Related U.S. Application Data

[62] Division of application No. 08/598,559, Feb. 12, 1996, Pat. No. 5,862,796.

[30] Foreign Application Priority Data

| Feb. 13, 1995 | [JP] | Japan | 7-24265 |
| Nov. 13, 1995 | [JP] | Japan | 7-294017 |
| Nov. 13, 1995 | [JP] | Japan | 7-294018 |

[51] Int. Cl.$^6$ .............. C07F 1/08; C07F 11/00; C07F 15/00
[52] U.S. Cl. .............. 556/115; 556/61; 556/114; 556/136; 48/127.3; 123/1 A; 123/527; 206/0.7
[58] Field of Search .............. 556/61, 114, 115, 556/136; 123/527, 1 A; 48/127.3; 206/0.7

[56] References Cited

U.S. PATENT DOCUMENTS

| 4,141,911 | 2/1979 | Matsumoto et al. | 260/438.5 R |
| 4,531,497 | 7/1985 | Smith | 123/525 |
| 5,025,758 | 6/1991 | Djurdjevic | 123/527 |
| 5,323,752 | 6/1994 | Von Herrmann et al. | 123/527 |
| 5,330,031 | 7/1994 | Hill et al. | 180/271 |
| 5,372,619 | 12/1994 | Greinke et al. | 48/127.3 |

FOREIGN PATENT DOCUMENTS

| 4206010 | 3/1993 | Germany . |
| 2065283 | 6/1981 | United Kingdom . |
| 2172985 | 10/1986 | United Kingdom . |

*Primary Examiner*—Porfirio Nazario-Gonzalez
*Attorney, Agent, or Firm*—Webb Ziesenheim Logsdon Orkin & Hanson P.C.

[57] ABSTRACT

A gas storage apparatus for use in storing a gas including methane as a main component thereof is disclosed. The apparatus includes an entrance/exit opening for allowing entrance or exit therethrough of a gas to be stored, a gas-tight maintaining mechanism capable of maintaining the gas under a pressurized state inside a container, and a pressure vessel which may be constantly maintained at a normal temperature. The pressure vessel accommodates therein an organometallic complex having a one-dimensional channel structure.

12 Claims, 14 Drawing Sheets

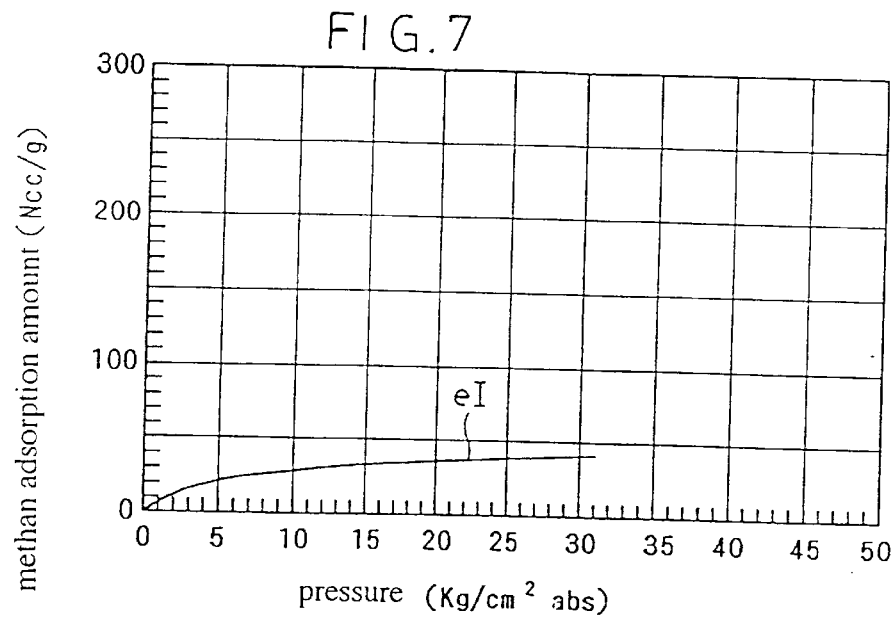
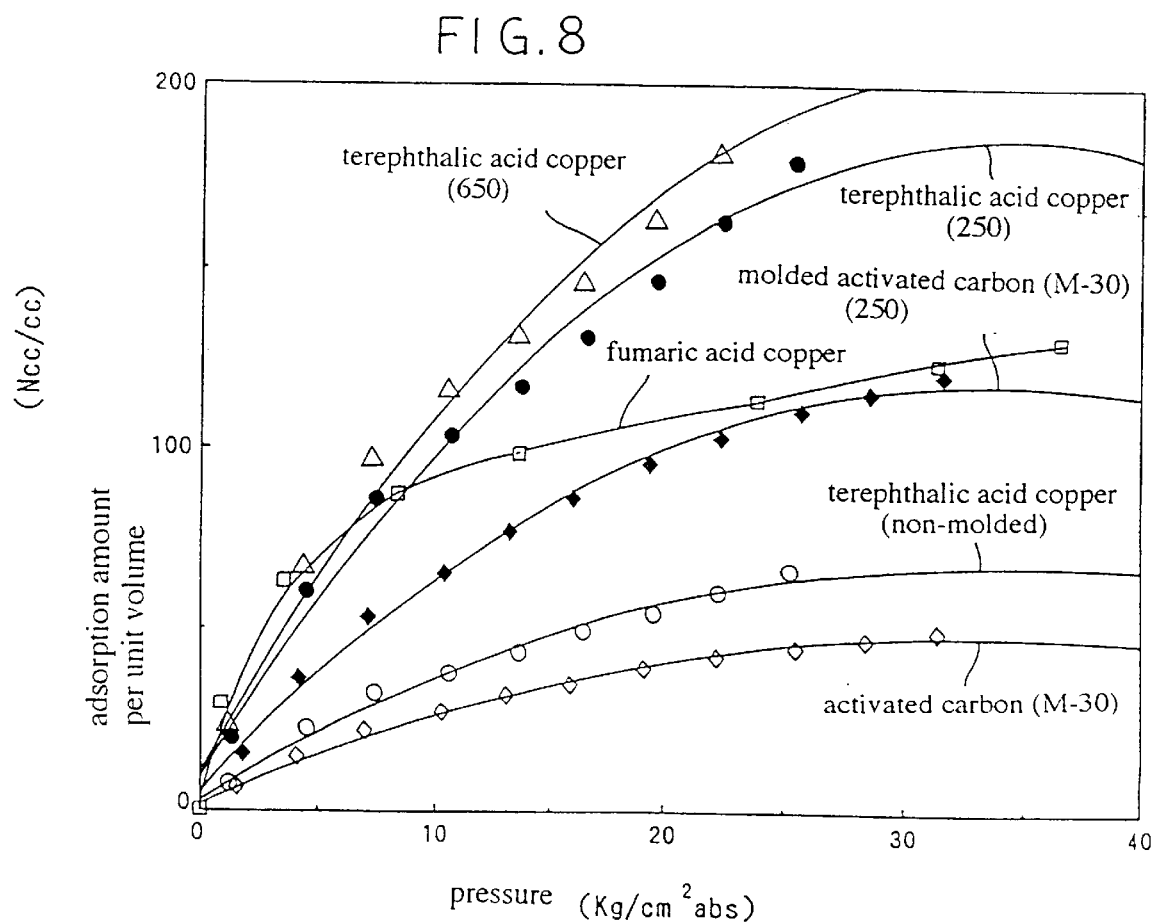

(25°C)

FIG. 19
(a)
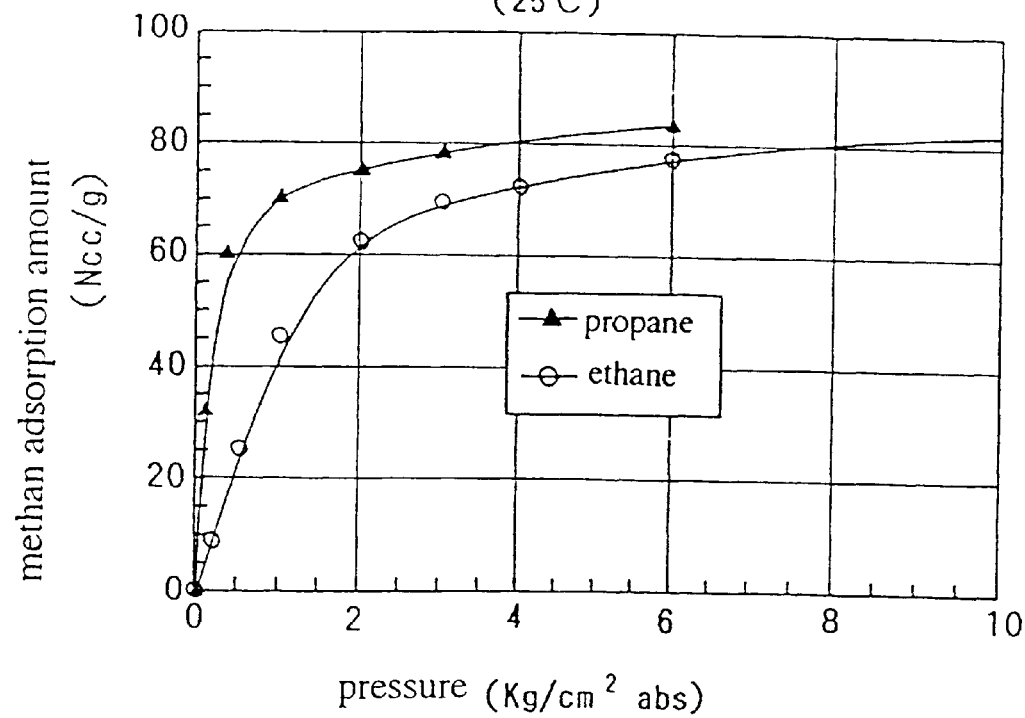
(b)
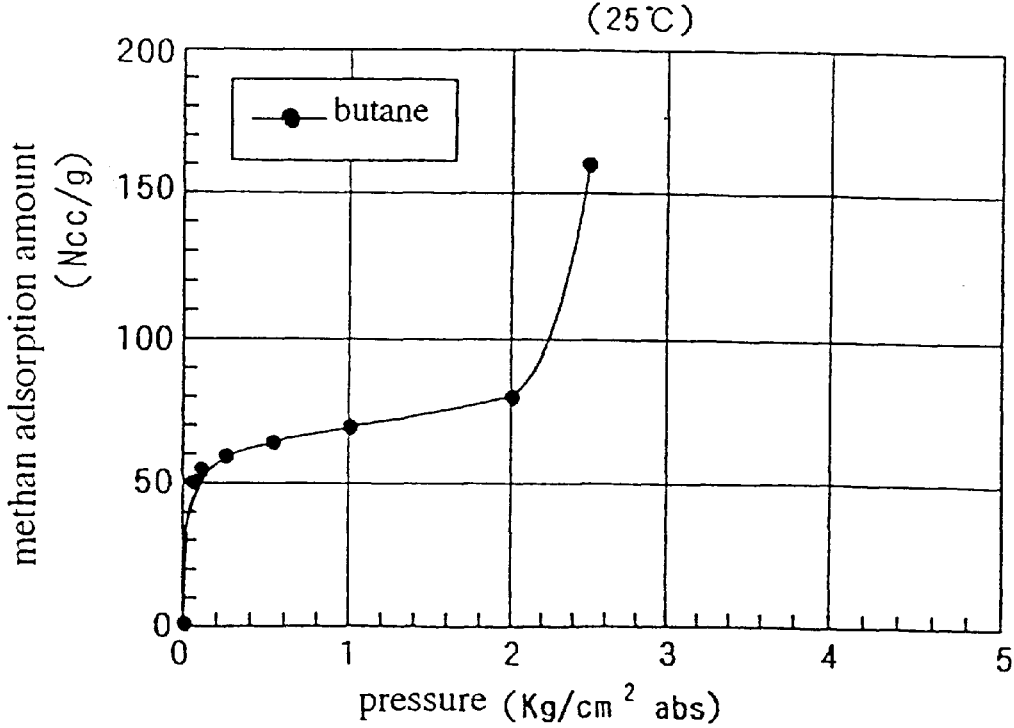

METHANE ADSORBING-RETAINING AGENT AND THE USE THEREOF IN A METHOD FOR GAS STORAGE

CROSS REFERENCE TO RELATED APPLICATION

This application is a divisional of U.S. patent application Ser. No. 08/598,559, filed Feb. 12, 1996, now U.S. Pat. No. 5,862,796 entitled "Gas Storage Apparatus, Gaseous Fuel Automobile Using the Gas Storage Apparatus, Gas Storage Method and Methane Adsorbing-Retaining Agent."

BACKGROUND OF THE INVENTION

1. FIELD OF THE INVENTION

The present invention relates to the art of storing gas including methane as a main component thereof, and relates also to a gaseous fuel automobile having a gas tank for storing e.g. natural gas as a fuel tank thereof.

2. DESCRIPTION OF THE RELATED ART

For storing gas including methane as the main component thereof, the convention has proposed use of mainly activated carbon as an adsorbent therefor.

However, activated carbon provides only limited gas adsorbing capacity relative to its volume. For increasing this gas adsorbing capacity per volume, it has also been proposed to mold the activated carbon into an solid adsorbent agent. Yet, the degree of improvement achieved by this method too is rather limited. On the other hand, activated carbon (large specific area activated carbon) having a relatively large surface area, hence, a greater gas adsorbent capacity per volume, is now available in the market. But, such improved activated carbons are expensive.

Further, with respect to the adsorption and desorption of gas, the activated carbon, due to significant variation in its pore diameter, comes to provide increasingly unstable adsorption/desorption performance with repetition of the gas adsorption and desorption. That is, the activated carbon has the problem of unsatisfactory repeatability.

In view of the above-described state of the art, a primary object of the invention is to propose improved art which allows inexpensive and greater volume gas adsorption and storage capacity and which also allows the gas adsorption performance with better repeatability. A further object is to provide a gaseous fuel automobile using this art.

A still further object of the invention is to provide a novel organometallic complex suitable as a gas adsorbing-retaining agent for a gas such as methane for use in e.g. a gas storage apparatus and a gaseous fuel automobile.

SUMMARY OF THE INVENTION

The above-noted object is accomplished by the invention as set forth in the appended claim 1. Namely, according to the features of the invention, there is provided a gas storage apparatus for use in storing a gas containing methane as a main component thereof, the apparatus comprising an entrance/exit opening for allowing entrance or exit therethrough of a gas to be stored; a gas-tight maintaining mechanism capable of maintaining the gas under a pressurized state inside a container; a pressure vessel which may be constantly maintained at a normal temperature; the pressure vessel accommodating therein an organometallic complex having a one-dimensional channel structure.

With the above construction, the pressure vessel of the apparatus accommodates therein an organometallic complex having a one-dimensional channel structure, into which vessel a gas containing methane as a main component thereof is introduced to be adsorbed to and retained or stored on the organometallic complex housed in this vessel. This storage takes place in the form of the adsorption and retention of the gas inside the one-dimensional channel structure of the complex and this is possible at the normal temperature. Further, for releasing the gas from the apparatus (i.e. desorption of the gas from the organometallic complex), for instance, a valve provided at the exit opening is opened so as to reduce the inside pressure of the pressure vessel, whereby the gas is desorbed from the organometallic complex to be discharged out of the apparatus for use in a certain application. In the above, the organometallic complex is molded into a high molded density so as to provide a high adsorbing capacity. Accordingly, this complex achieves significantly higher gas adsorbing-retaining capacity per volume, in comparison with e.g. the activated carbon mentioned above.

Preferably, the organometallic complex comprises at least one complex selected from the group consisting of terephthalic acid copper, fumaric acid copper, 1,4-trans-cyclohexane dicarboxylic acid copper, biphenyl dicarboxylic acid copper, fumaric acid molybdenum, 1,4-trans-cyclohexane dicarboxylic acid molybdenum, biphenyl dicarboxylic acid molybdenum, terephthalic acid chrome, fumaric acid chrome, 1,4-trans-cyclohexane dicarboxylic acid chrome, biphenyl dicarboxylic acid chrome, terephthalic acid rhodium, fumaric acid rhodium, 1,4-trans-cyclohexane dicarboxylic acid rhodium, biphenyl dicarboxylic acid rhodium, terephthalic acid palladium, fumaric acid palladium, 1,4-trans-cyclohexane dicarboxylic acid palladium, biphenyl dicarboxylic acid palladium, terephthalic acid tungsten, fumaric acid tungsten, 1,4-trans-cyclohexane dicarboxylic acid tungsten, and biphenyl dicarboxylic acid tungsten.

The use of the organometallic complex of the above-noted kind, due to its distinguished methane adsorbing capacity under a pressurized, normal temperature condition, the gas may be efficiently stored within a relatively limited volume.

A gaseous fuel automobile, according to the present invention, comprises the gas storage apparatus according to claim 1, and an internal combustion engine powered by the gas supplied from the gas storage apparatus.

In a gaseous fuel automobile, the smaller the volume of the fuel gas tank (one example of the gas storage apparatus), the better. Then, the gas storage apparatus according to the invention satisfies this requirement, and the gaseous fuel automobile utilizing this compact gas storage apparatus may reserve an ample space for accommodating other automobile components than the gas fuel storage tank.

More particularly, with this gaseous fuel automobile, a large amount of fuel gas may be stored within a relatively small volume under a relatively low pressure, so that this automobile can run a greater distance at one time, despite its compact fuel tank. This improvement will promote the popularity of gaseous fuel automobiles, which will eventually contribute to restriction of environmental contamination through the use of clean energy by automobiles.

Preferably, the organometallic complex used in this automobile comprises at least one dicarboxylic acid copper complex selected from the group consisting of terephthalic acid copper, fumaric acid copper, 1,4-trans-cyclohexane dicarboxylic acid copper, biphenyl dicarboxylic acid copper, fumaric acid molybdenum, 1,4-trans-cyclohexane dicarboxylic acid molybdenum, biphenyl dicarboxylic acid molybdenum, terephthalic acid chrome, fumaric acid chrome, 1,4-trans-cyclohexane dicarboxylic acid chrome, biphenyl dicarboxylic acid chrome, terephthalic acid rhodium, fumaric acid rhodium, 1,4-trans-cyclohexane dicarboxylic acid rhodium, biphenyl dicarboxylic acid rhodium, terephthalic acid palladium, fumaric acid palladium, 1,4-trans-cyclohexane dicarboxylic acid palladium, biphenyl dicarboxylic acid palladium, terephthalic acid tungsten, fumaric acid tungsten, 1,4-trans-cyclohexane dicarboxylic acid tungsten, and biphenyl dicarboxylic acid tungsten.

With this feature, the automobile may effectively utilize the distinguished gas storage capacity afforded by the above-specified organometallic complex and achieve the above-mentioned advantages.

In a gas storage method, according to the present invention, a target gas is adsorbed and retained, under a pressurized, normal temperature condition, on an adsorbing-retaining agent comprising as a main component thereof an organometallic complex having a one-dimensional channel structure.

In the above gas storage method, for the gas adsorption and storage, there is used an adsorbing-retaining agent including as the main component thereof an organometallic complex having a one-dimensional channel structure and comprising at least one selected from the group consisting of terephthalic acid copper, fumaric acid copper, 1,4-trans-cyclohexane dicarboxylic acid copper, biphenyl dicarboxylic acid copper, fumaric acid molybdenum, 1,4-trans-cyclohexane dicarboxylic acid molybdenum, biphenyl dicarboxylic acid molybdenum, terephthalic acid chrome, fumaric acid chrome, 1,4-trans-cyclohexane dicarboxylic acid chrome, biphenyl dicarboxylic acid chrome, terephthalic acid rhodium, fumaric acid rhodium, 1,4-trans-cyclohexane dicarboxylic acid rhodium, biphenyl dicarboxylic acid rhodium, terephthalic acid palladium, fumaric acid palladium, 1,4-trans-cyclohexane dicarboxylic acid palladium, biphenyl dicarboxylic acid palladium, terephthalic acid tungsten, fumaric acid tungsten, 1,4-trans-cyclohexane dicarboxylic acid tungsten, and biphenyl dicarboxylic acid tungsten. Such organometallic complex as specified above adsorbs and retains a target gas containing methane as the main component thereof, and this adsorption may take place under the pressurized, normal temperature condition.

This fact has been newly discovered by the present inventors. And, the method can effectively utilize such distinguished property afforded by such complex.

Further, this organometallic complex may be relatively easily composed from readily and inexpensively available materials, so that the method provides significant economical advantage. Further, since it is possible to provide the complex with relatively high density through its appropriate molding, its volume adsorbing capacity may be significantly increased, so that the method provides a further advantage in terms of the gas storing capacity also. Moreover, the pore diameter of the complex is fairly stable throughout the complex structure. Hence, this complex can be free from such trouble that gas component other than the target gas component remains inadvertently adsorbed on the complex so as to result in deterioration of the repeatability.

According to a methane adsorbing-retaining agent relating also to the present invention, the agent is obtained by mixing dicarboxylic acid dissolved in an organic solvent with a solution containing at least one selected from the group of salt of copper, molybdenum, chrome, rhodium, tungsten and of palladium; and the agent comprises, as a main component thereof, an organometallic complex having a one-dimensional channel structure.

The organometallic complex used in the methane adsorbing-retaining agent is obtained by mixing dicarboxylic acid dissolved in an organic solvent with a solution containing at least one selected from the group of salt of copper, molybdenum, chrome, rhodium, tungsten and of palladium.

Preferably, the organometallic complex used in the methane adsorbing-retaining agent is obtained by mixing the dicarboxylic acid dissolved in the organic solvent with an additive comprising an organic acid of at least one selected from the group consisting of formate, acetate, trifluoro acetate, and propionic acid, and then mixing this mixture with a solution containing at least one selected from the group consisting of salt of copper, molybdenum, chrome, rhodium, tungsten and of palladium.

With the above, by the addition of the additive to the dicarboxylic acid solution, the crystalline structure may be stabilized, whereby the adsorbing capacity may be substantially controlled. Moreover, since the above synthetic process is relatively simple, the complex may be obtained inexpensively.

Further, through the selection of the kind of the dicarboxylic acid, the pore diameter may be controlled, whereby an adsorbing-retaining agent best suited for the property of the target gas may be obtained.

The solution containing the copper salt may comprise a solution containing at least one kind selected from the group consisting of copper formate, copper acetate, copper sulfate, copper nitrate, and copper carbonate. As for the solution containing chrome salt, molybdenum salt, and rhodium salt, it is preferred that said solution comprise solution of chrome acetate, molybdenum acetate, or rhodium acetate. As for the solution containing tungsten salt or palladium salt, it is preferred that said solution comprise solution of salt acetate or of chloride.

With the above, since the solution is inexpensive and easy to handle, this is advantageous for mass synthesis.

Still further, the organometallic complex used in the invention may comprise biphenyl dicarboxylic acid copper complex obtained by mixing biphenyl dicarboxylic acid solution with a solution containing a bivalent copper salt.

The biphenyl dicarboxylic acid copper complex noted above is per se a novel substance.

As for this novel biphenyl dicarboxylic acid copper complex will be described next by using 4, 4'-biphenyl dicarboxylic acid copper as one example.

More particularly, based on measurement of its magnetic susceptibility, this novel 4, 4'-biphenyl dicarboxylic acid copper complex is considered to have a planar or two-dimensional lattice-like structure in which a number of two-nucleus structures having dicarboxylic acids coordinated around a copper ion are bonded to each other through mutual bonding of their adjacent copper ions via the dicarboxylic acid, the copper ions being present at the crossing points a, a, a, . . . of the lattice. Further, a structural computer simulation analysis according to the molecular dynamic (MD) method, based on structure data of various known copper complexes, as illustrated in FIG. 15, a plurality of the above-described two-dimensional structures are considered to be crystallized in such a manner that the respective crossing points of the vertically stacked lattices are vertically aligned with gaps b, b, b . . . between the adjacent crossing points together forming a one-dimensional channel structure.

Then, the property of this novel 4, 4'-biphenyl dicarboxylic acid copper complex was studied. This study has revealed that the complex presents adsorbing property relative to fuel gases such as methane, ethane, propane and butane and to oxygen, nitrogen and so on. Further, based on an X-ray diffraction pattern obtained therefrom, the distance between the adjacent copper ions is approximately 15 Å (see FIG. 16).

That is, it is expected that due to the above-described channel structure the 4, 4'-biphenyl dicarboxylic acid copper complex provides the gas adsorbing effect as well as catalytic effects for effecting isomerization, polymerization, oxidization and reduction on the various compounds introduced into the channel structure.

The 4, 4'-biphenyl dicarboxylic acid solution may include an additive of an organic acid.

Such 4, 4'-biphenyl dicarboxylic acid copper complex may be readily obtained by mixing the biphenyl dicarboxylic acid solution with the solution containing a bivalent copper salt. For realizing such reaction, by adding in advance the additive of organic acid to the 4, 4'-biphenyl dicarboxylic acid solution, the pH value may be controlled to suit the particular reaction condition relative to the selected copper salt, so that the 4, 4'-biphenyl dicarboxylic acid copper complex can be efficiently obtained under such mild reaction condition and eventually an inexpensive product may be obtained.

The organic acid may comprise at least one kind selected from the group consisting of formate, acetate, trifluoro acetate, and propionic acid. And, preferably, the solvent of the solution containing the copper salt comprises an alcohol such as methanol, ethanol, propanol, or an organic solvent such as benzene, toluene, acetonitrile, tetrahydrofuran, dimethylsulfoxide, dimethylformamide, dimethylacetoamido, hexane, acetone, or the like.

If the organic acid is at least one kind selected from the group consisting of formate, acetate, trifluoro acetate, and propionic acid, the above-described reaction may be hardly affected adversely.

For instance, even if the copper salt comprises at least one kind selected from the group consisting of fumaric acid copper and acetate copper, there will hardly occur any inconvenience which leads to destruction of the generated biphenyl dicarboxylic acid copper complex. Incidentally, if the copper salt comprises an inorganic copper salt such as copper sulfate, copper nitrate, and copper carbonate, the above-described reaction is hardly affected adversely. Then, the synthesis reaction can be realized without the addition of the additive.

As the solvent of the solution containing copper salt, an alcohol such as methanol, ethanol, propanol, or an organic solvent such as benzene, toluene, acetonitrile, tetrahydrofuran, dimethylsulfoxide, dimethylformamide, hexane, acetone, or the like, is suitable for the above reaction, so that the biphenyl dicarboxylic acid copper complex may be efficiently obtained under the mild reaction condition. Hence, the biphenyl dicarboxylic acid copper complex may be obtained at low costs, thereby to serve to provide an inexpensive product.

Still preferably, the biphenyl dicarboxylic acid comprises 4, 4'-biphenyl dicarboxylic acid.

With use of this 4, 4'-biphenyl dicarboxylic acid, it becomes advantageously possible to obtain a biphenyl dicarboxylic acid copper complex having the maximum adsorption amount.

Other features of the invention are as set forth in the dependent claims. With these further features, still more favorable functions and effects may be achieved.

According to the above-described various features of the present invention, it has become possible to provide a gas storage apparatus having greater volume gas capacity as well as a gaseous fuel automobile having structural advantage.

Further, it has become also possible to provide a methane adsorbing-retaining agent which has greater volume adsorption capacity and improved repeatability and which also is easy and inexpensive to synthesize and a gas storage method having such features as well.

Moreover, in this gas storage method, through appropriate selection of the kind of dicarboxylic acid constituting the complex, the method enables highly efficient gas storage suited for the particular type of the target gas.

Further and other objects, features and effects of the invention will become more apparent from the following more detailed description of the embodiments of the invention with reference to the accompanying drawings.

BRIEF DESCRIPTION OF THE DRAWINGS

FIG. 7 is a graph showing the gas adsorption capacity (adsorption isotherm) of a phenylene dicarboxylic acid copper complex, FIG. 8 is a graph showing in comparison the gas adsorption capacities (adsorption isotherms) of the terephthalic acid copper complex, its various molded products and activated carbon, FIGS. 19(a), 19(b) are graphs showing fuel gas adsorption capacities (adsorption isotherms) of the 4, 4'-biphenyl dicarboxylic acid copper complex.

DESCRIPTION OF THE PREFERRED EMBODIMENTS

Preferred embodiments of the invention will be described next with reference to the accompanying drawings.

Figure 1:
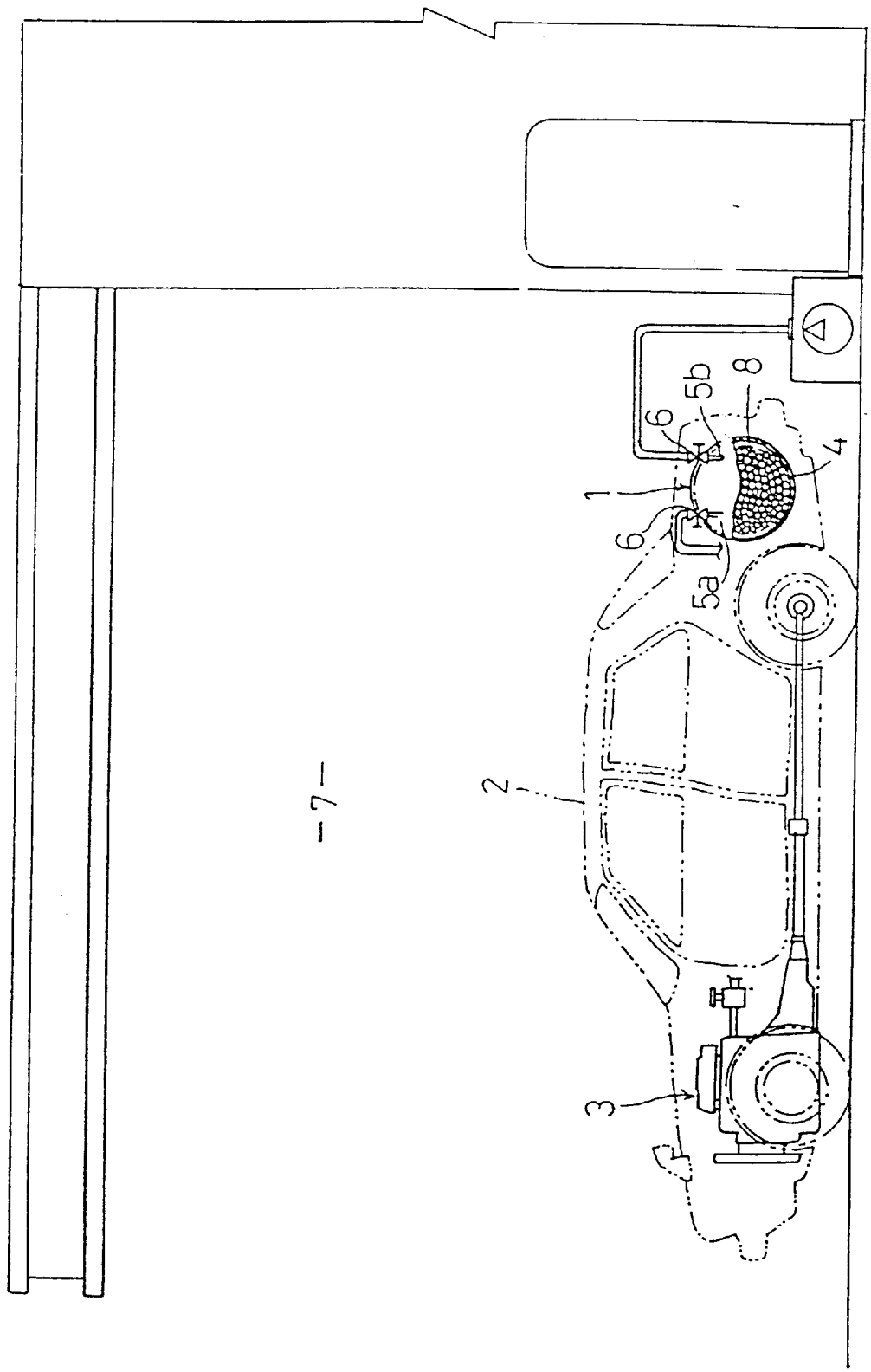
FIG. 1 is a schematic view of a gaseous fuel automobile.

FIG. 1 schematically shows a gaseous fuel automobile 2 equipped with a gas storage apparatus according to the invention. This gaseous fuel automobile 2 includes a fuel tank 1 as the gas storage apparatus of the invention, and an engine 3 as an internal combustion engine receiving natural gas from the fuel tank 1 storing the gas, mixing this gas with a combustion oxygen containing gas (e.g. air), and obtaining a drive force from combustion of the gas mixture for the run of the automobile.

The fuel tank 1 includes a so-called pressure vessel 4 and a pair of exit opening 5a and entrance opening 5b acting as an entrance and an exit through which the gas to be stored in this tank may enter and exit. Adjacent each of the exit and entrance, there are provided a pair of valves 6 constituting a gas-tight maintaining mechanism for maintaining the gas under a pressurized condition within the pressure vessel 4. The natural gas, as the fuel, is charged under a pressurized condition into the fuel tank 1 at an appropriate gas filling station 7. Needless to say, this gas tank 1 is generally placed under the normal temperature condition, without being cooled in particular. So that, in the summer season of the rising temperature, the tank 1 is subjected to a relatively high temperature. Under such condition, an organometallic complex related to the present invention and described later can work efficiently with a high adsorption capacity under such relatively high temperature range (i.e. 25 to 60° C.).

The fuel tank 1 accommodates therein an organometallic complex 8 configured according to the present invention. This organometallic complex 8 adsorbs the natural gas (an example of gas including methane as the main component thereof) under the pressurized, normal temperature condition. When the exit valves 6 are opened up, the adsorbed gas is desorbed from the organometallic complex 8 to be sent to the engine 3 in which the gas is combusted to provide the driving force for the automobile.

More particularly, the organometallic complex comprises e.g. a terephthalic acid copper having a one-dimensional channel structure and a molded density of 1.53 g/cm$^3$ (molded at 650 Kg/cm$^2$).

Next, some specific synthesis methods of manufacturing the organometallic complex will be described.
(1) Synthesis of Organometallic Complex The organometallic complex used in the present invention has a one-dimensional channel structure. A typical example of the complex is dicarboxylic acid copper complex.

(1)-1 Synthesis Conditions of Dicarboxylic Acid Copper Complex

Dicarboxylic acid is dissolved in an organic solvent, to which an organic acid as an additive is added for pH adjustment (this additive is necessarily needed in case formic acid copper, copper carbonate, or copper acetate is used). Into this solution, a solution of formic acid copper or acetate copper is dripped. This mixture solution is kept still for a few hours to a few days, and solid substance formed therein by precipitation is suction-filtered and then dried at 120° C. for five hours, whereby a target chemical compound is obtained.

The dicarboxylic acid may any one of terephthalic acid, fumaric acid, 1,4-trans-cyclohexane dicarboxylic acid, 2, 6-naphthalene dicarboxylic acid, 1,4-naphthalene dicarboxylic acid, muconic acid, 1,4-phenylene didiacrylic acid, 1,4-phenylene diacetate, adipic acid, suberic acid, dicarboxylic biphenyl ether, dicarboxy diphenyl sulfonic acid, 4, 4'-biphenyl dicarboxylic acid, or the like, may be used. Through selection among these dicarboxylic acids, the size of the channel may be adjusted.

Of the above, terephthalic acid, fumaric acid, 1,4-trans-cyclohexane dicarboxylic acid, 2.6-naphthalene dicarboxylic acid are preferred. With use of these acids, there may be obtained a dicarboxylic acid complex having a large specific surface area and large adsorption capacity.

As the organic solvent, an alcohol such as methanol, ethanol, propanol, or an organic solvent such as benzene, toluene, acetonitrile, tetrahydrofuran, dimethylsulfoxide, dimethylformamide, hexane, acetone, or the like, or mixture solvents of these, which may dissolve dicarboxylic acid and copper compound, may be employed.

Of the above, methanol, ethanol, DMF and a mixture of alcohol and DMF are preferred. These alcohols can readily dissolve the substrate, while not dissolving the reaction product. Further, these are not coordinated within the complex, so that the production of non-adsorbing-retaining complex may be effectively prevented.

As the organic acid, formate, acetate, trifluoro acetate, and propionic acid or the like may be employed. Of these, formate and acetate are preferred.

The reaction temperature for the synthesis reaction may vary from −20° C. to 80° C. approximately and the reaction is possible at the normal temperature.

Further, referring to the concentration of the substrate in the synthesis reaction, dicarboxylic acid should be between 0.005 mol/l to 0.1 mol/l, preferably, 0.02 mol/l to 0.08 mol/l. The concentration in the latter range can provide especially satisfactory result. Further, relative to the above substrate, the addition amount of the fumaric acid copper and copper acetate as the organic acid copper should be 0.5 mol equivalent to 2 mol equivalent, relative to the dicarboxylic acid. If the amount is less than this range, this will reduce the yield. Conversely, if the amount is greater than 2 mol equivalent, a disadvantageous side reaction will occur, due to its relation to the coordination number of copper (2 copper atoms are coordinated). Further, the production of the complex may be promoted by adding, as an additive, the organic acid in the order of 0.1 to 2.0%, preferably, 0.5 to 10%. In this case, if the addition amount is less than the above-defined range, the adsorption capacity will not increase by a satisfactory degree. Conversely, if the amount is greater than the range, the production of the target substance will be more difficult.

Incidentally, the biphenyl dicarboxylic acid copper complex used in the present invention comprises a novel dicarboxylic acid copper complex discovered by the present inventors. Next, the synthesis conditions of this complex will be described.

For obtaining this biphenyl dicarboxylic acid copper complex, a biphenyl dicarboxylic acid solution added with an additive comprising at least one kind of organic acid selected from the group consisting of formate, acetate, trifluoro acetate, and propionic acid is mixed with a further solution in which at least one kind of copper salt selected from the group consisting of copper formate, copper acetate, copper sulfate, copper nitrate, and copper carbonate is dissolved in an organic solvent comprising at least one kind selected from the group consisting of methanol, ethanol, propanol, benzene, toluene, acetonitrile, tetrahydrofuran, dimethylsulfoxide, dimethylformamide, dimethylacetoamido, hexane, acetone, or the like. Then, this mixture solution is kept still to obtain the complex.

Alternatively, the biphenyl dicarboxylic acid solution is mixed with the solution in which at least one kind of copper salt selected from the group consisting of copper formate, copper acetate, copper sulfate, copper nitrate, and copper carbonate is dissolved in an organic solvent comprising at least one kind selected from the group consisting of methanol, ethanol, propanol, benzene, toluene, acetonitrile, tetrahydrofuran, dimethylsulfoxide, dimethylformamide, hexane, acetone, or the like. Then, from this mixture solution, the target complex may be obtained as its precipitation product.

This novel biphenyl dicarboxylic acid copper complex is used as a methane gas adsorbing-retaining material. For instance, the complex in the form of powder could adsorb and retain about 150 N $cm^3/g$ under pressure of about 30 $Kg/cm^2$ (abs).

(1)-2: Example of Synthesis of Dicarboxylic Acid copper complex

As the dicarboxylic acid copper complex, attempts were made to synthesize terephthalic acid copper, fumaric acid copper, 1,4-trans-cyclohexane dicarboxylic acid copper, 2,6-naphthalene dicarboxylic acid copper, p-phenylenedi copper acetate, and biphenyl dicarboxylic acid copper.

Figure 14:
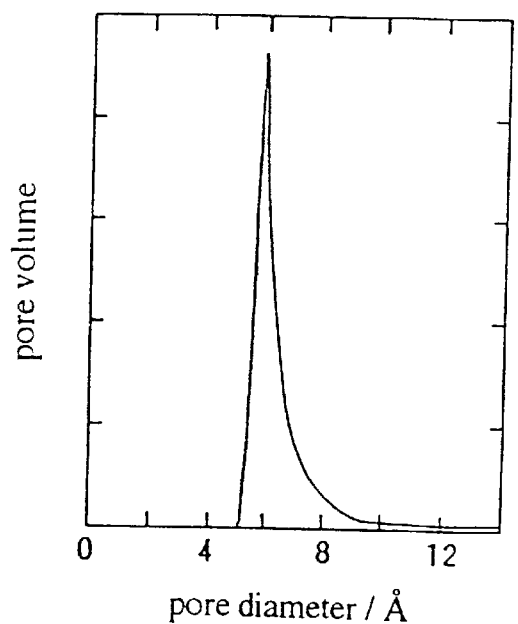
FIG. 14 is a graph showing pore diameter distribution of the terephthalic acid copper complex.
Figure 15:
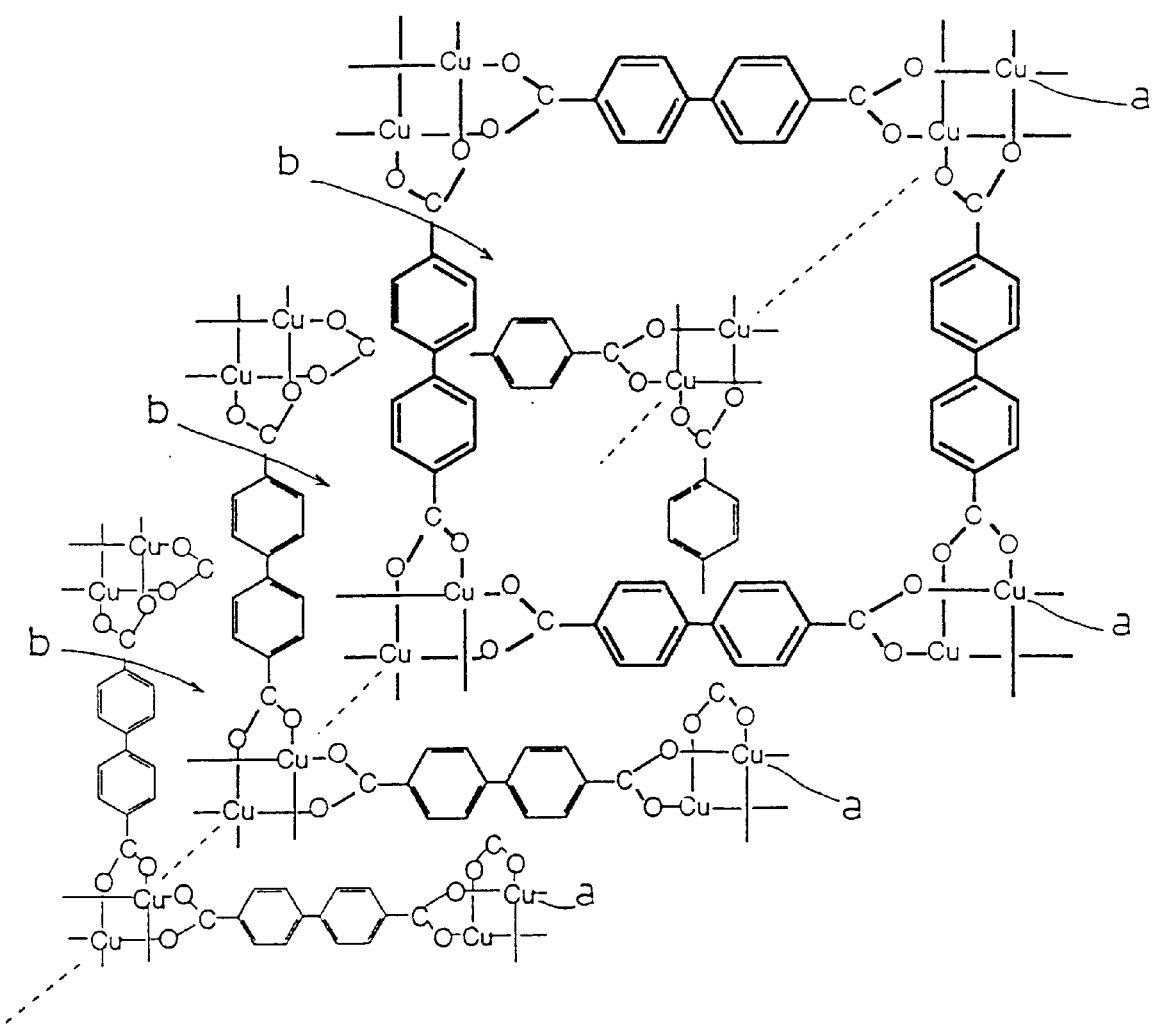
FIG. 15 is a schematic view showing a three-dimensional structure of the 4, 4'-biphenyl dicarboxylic acid copper complex.
Figure 16:
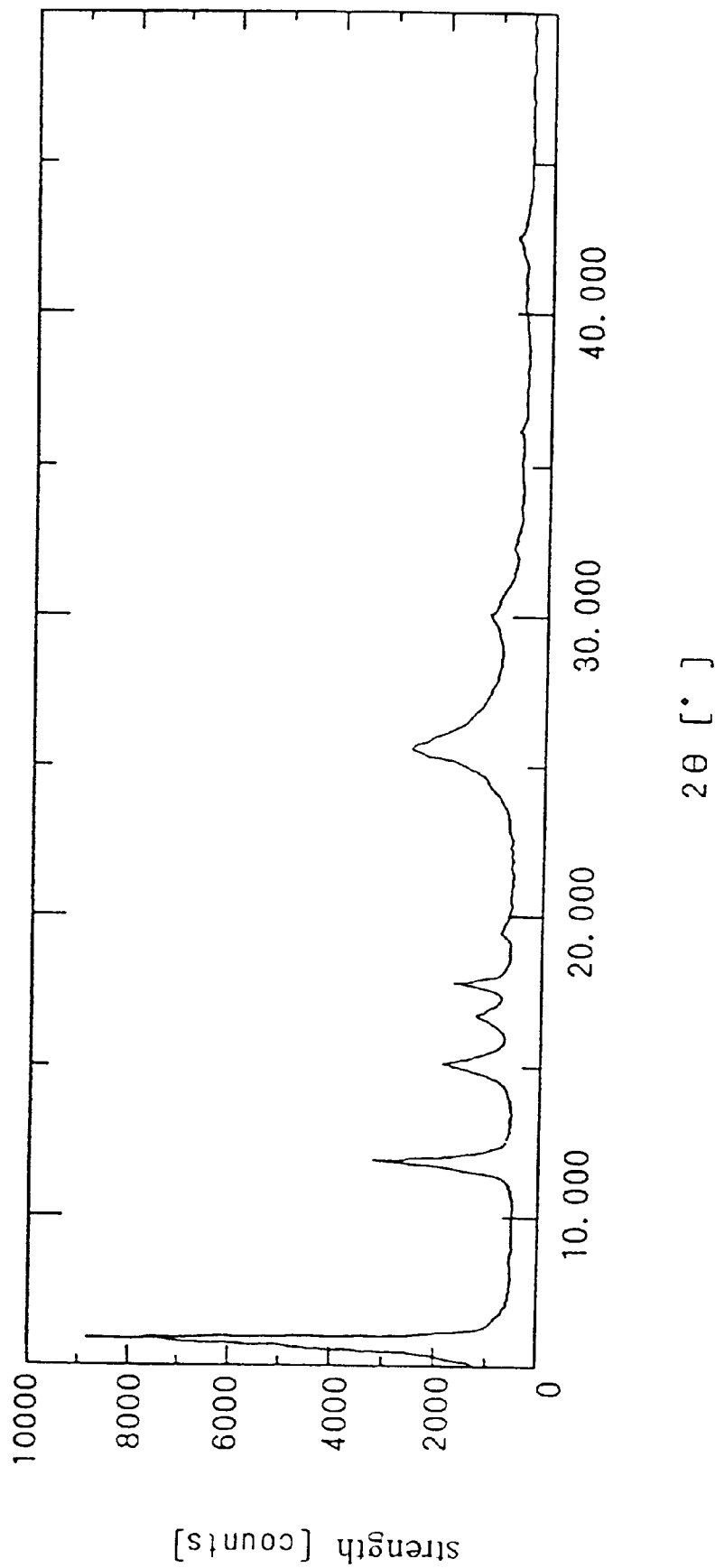
FIG. 16 is a graph showing a powder X-ray diffraction pattern of the 4, 4'-biphenyl dicarboxylic acid copper complex.

[a] terephthalic acid copper (I) 1.2 g of terephthalic acid was dissolved under heating in a mixture solvent of 800 $cm^3$ of methanol and 30 $cm^3$ of formic acid. After this solution was cooled to the normal temperature, into this solution, a further solution in which 3.0 g of formic acid copper was dissolved in 150 $cm^3$ of methanol was dripped and then this was kept still for two days. Thereafter, the precipitation product was suction-filtered and dried for 120° C./4 hours, whereby 2.1 g of terephthalic acid copper was obtained. This substance had the specific surface area of 220 $m^2/g$. And, a measurement according to the HK method using argon revealed that the substance had the pore diameter of 6.0 Å (see FIG. 14) (Incidentally, its pore diameter was measured as 9.3 Å in a further measurement according to the MP method using nitrogen. Then, it was found that for the measurement of pore diameter of the dicarboxylic acid copper complex of this kind the HK method generally believed to be suitable for measurement of pore diameter smaller than 10 Å is suitable.)

(II) 0.70 g of terephthalic acid was dissolved under heating in a mixture solvent of 400 $cm^3$ of methanol and 20 $cm^3$ of acetate. After this solution was cooled to the normal temperature, into this solution, a further solution in which 0.95 g of formic acid copper was dissolved in 50 $cm^3$ of methanol was dripped and then this was kept still for a few days. Thereafter, the precipitation product was suction-filtered and dried for 110° C./4 hours, whereby 0.41 g of terephthalic acid copper was obtained.

(III) 0.41 g of terephthalic acid was dissolved under heating in a mixture solvent of 250 $cm^3$ of methanol and 15 $cm^3$ of formic acid. After this solution was cooled to the normal temperature, into this solution, a further solution in which 0.50 g of copper acetate was dissolved in 40 $cm^3$ of methanol was dripped and then this was kept still for a few days. Thereafter, the precipitation product was suction-filtered and dried for 110° C./4 hours, whereby 0.38 g of terephthalic acid copper was obtained.

[b] fumaric acid copper (I) 1.2 g of fumaric acid was dissolved under heating in a mixture solvent of 100 $cm^3$ of methanol and 12 $cm^3$ of formic acid. After this solution was cooled to the normal temperature, into this solution, a further solution in which 3.38 g of formic acid copper was dissolved in 100 $cm^3$ of methanol was dripped and then this was kept still for one day. Thereafter, the precipitation product was suction-filtered and dried for 120° C./4 hours, whereby 1.37 g of fumaric acid copper was obtained.

This substance had the specific surface area of 450 $m^2/g$.

(II) 1.74 g of fumaric acid and 40 $cm^3$ of acetate were dissolved under heating in 100 $cm^3$ of methanol, and into this solution, 100 $cm^3$ of methanol solution containing 2.98 g of copper acetate dissolved therein was dripped. After this solution was left still for two days at the room temperature, the precipitation product was suction-filtered and dried for 110° C./3 hours, whereby 1.37 g of fumaric acid copper was obtained. In this case too, the obtained substance had a large specific surface area and exhibited adsorption capacity for methane.

(III) 1.74 g of fumaric acid was dissolved in a mixture solvent having 100 $cm^3$ of methanol and 8 $cm^3$ of formic acid. Then, under stirring at the normal temperature, into the above solution, a further solution in which 3.38 g of formic acid copper was dissolved in 100 $cm^3$ of methanol was dripped. After this solution was left still for one day, the precipitation product was suction-filtered and dried for 120° C./4 hours, whereby 1.23 g of fumaric acid copper was obtained. This substance had the specific surface area of 480 $m^2/g$.

(IV) 1.74 g of formic acid was dissolved in a mixture solvent having 100 $cm^3$ of methanol and 1 $cm^3$ of formic acid. Then, under stirring at the normal temperature, into the above solution, a further solution in which 3.74 g of copper sulfate ($CuSO_4 5H_2O$) was dissolved in 100 $cm^3$ of methanol was dripped and left still for one day. Thereafter, the precipitation product was suction-filtered and dried for 120° C./4 hours, whereby 0.3 g of fumaric acid copper was obtained.

(V) 0.58 g of fumaric acid was dissolved in a mixture solvent having 40 $cm^3$ of methanol and 12 $cm^3$ of formic acid. Then, under stirring at the normal temperature, into the above solution, a further solution in which 1.0 g of copper acetate was dissolved in 80 $cm^3$ of methanol was dripped. After this solution was left still for a few days, the precipitation product was suction-filtered and dried for 110° C./4 hours, whereby 0.3 g of fumaric acid copper was obtained.

Measurements according to the HK method using argon revealed that these fumaric acid copper complexes had the pore diameter of about 5.4 Å.

[c] 1,4-trans-cyclohexane dicarboxylic acid copper:

(I) 2.53 g of 1,4-trans-cyclohexane dicarboxylic acid was dissolved under heating in a mixture solvent of 100 $cm^3$ of methanol and 14 $cm^3$ of formic acid. After this solution was cooled to the normal temperature, into this solution under stirring, a further solution in which 3.38 g of formic acid copper was dissolved in 100 $cm^3$ of methanol was dripped and then this was kept still for one day. Thereafter, the precipitation product was suction-filtered and dried for 120° C./4 hours, whereby 1.71 g of 1,4-trans-cyclohexane dicarboxylic acid copper was obtained. This substance had the specific surface area of 480 m²/g and the pore diameter of 4.7 Å.

(II) 2.58 g of 1,4-trans-cyclohexane dicarboxylic acid was dissolved under heating in a mixture solvent of 100 cm³ of methanol and 20 cm³ of formic acid. After this solution was cooled to the normal temperature, into this solution under stirring, a further solution in which 3.38 g of formic acid copper was dissolved in 100 cm³ of methanol was dripped and then this was kept still for a few days. Thereafter, the precipitation product was suction-filtered and dried for 110° C./4 hours, whereby 1.43 g of 1,4-trans-cyclohexane dicarboxylic acid copper was obtained.

[d] 2, 6-naphthalene dicarboxylic acid copper (I) 0.40 g of 2, 6-naphthalene dicarboxylic acid was dissolved under heating in a mixture solvent of 4000 cm³ of methanol and 5 cm³ of formic acid. After this solution was cooled to the normal temperature, into this solution under stirring, a further solution in which 3.00 g of formic acid copper was dissolved in 100 cm³ of methanol was dripped and then this was kept still for a few days. Thereafter, the precipitation product was suction-filtered and dried for 110° C./4 hours, whereby 0.35 g of 2, 6-naphthalene dicarboxylic acid copper was obtained.

[e] p-phenylenedi copper acetate (I) 2.58 g of p-phenylenedi acetate was dissolved under heating in a mixture solvent of 100 cm³ of methanol and 2.5 cm³ of formic acid. After this solution was cooled to the normal temperature, into this solution under stirring, a further solution in which 2.00 g of formic acid copper was dissolved in 150 cm³ of methanol was dripped and then this was kept still for a few days. Thereafter, the precipitation product was suction-filtered and dried for 110° C./4 hours, whereby 1.40 g of p-phenylenedi copper acetate was obtained.

[f] 4, 4'-biphenyl dicarboxylic acid copper:

A. A dicarboxylic acid solution was prepared by dissolving 0.25 g of 4, 4'-biphenyl dicarboxylic acid into a mixture solution of 60 cm³ of dimethylforamido and 1 cm³ of formic acid. A formic acid copper solution was prepared by dissolving 0.5 g of fumaric acid copper in methanol. Then, the formic acid copper solution was dripped and mixed into the dicarboxylic acid solution while the latter was being stirred under the normal temperature. After this mixture solution was left still for one day, a 4, 4'-biphenyl dicarboxylic acid copper complex was obtained as its precipitation product. Then, this precipitation product was suction-filtered and dried for 100° C./4 hours, whereby 0.29 g of 4, 4'-biphenyl dicarboxylic acid copper complex was obtained.

B. A dicarboxylic acid solution was prepared by dissolving 0.25 g of biphenyl 4, 4'-dicarboxylic acid into 60 cm³ of dimethylformamide. On the other hand, a copper sulfate solution was prepared by dissolving 0.25 g of copper sulfate ($CuSO_4 \cdot 5H_2O$) in dimethylformamide. Then, the copper sulfate solution was dripped and mixed into the dicarboxylic acid solution while the latter was being stirred under the normal temperature. After this mixture solution was left still for one day, a 4, 4'-biphenyl dicarboxylic acid copper complex was obtained as its precipitation product. Then, this precipitation product was suction-filtered and dried for 100° C./4 hours, whereby 0.25 g of 4, 4'-biphenyl dicarboxylic acid copper complex was obtained.

(2) Structure of the Complexes

Figure 2:
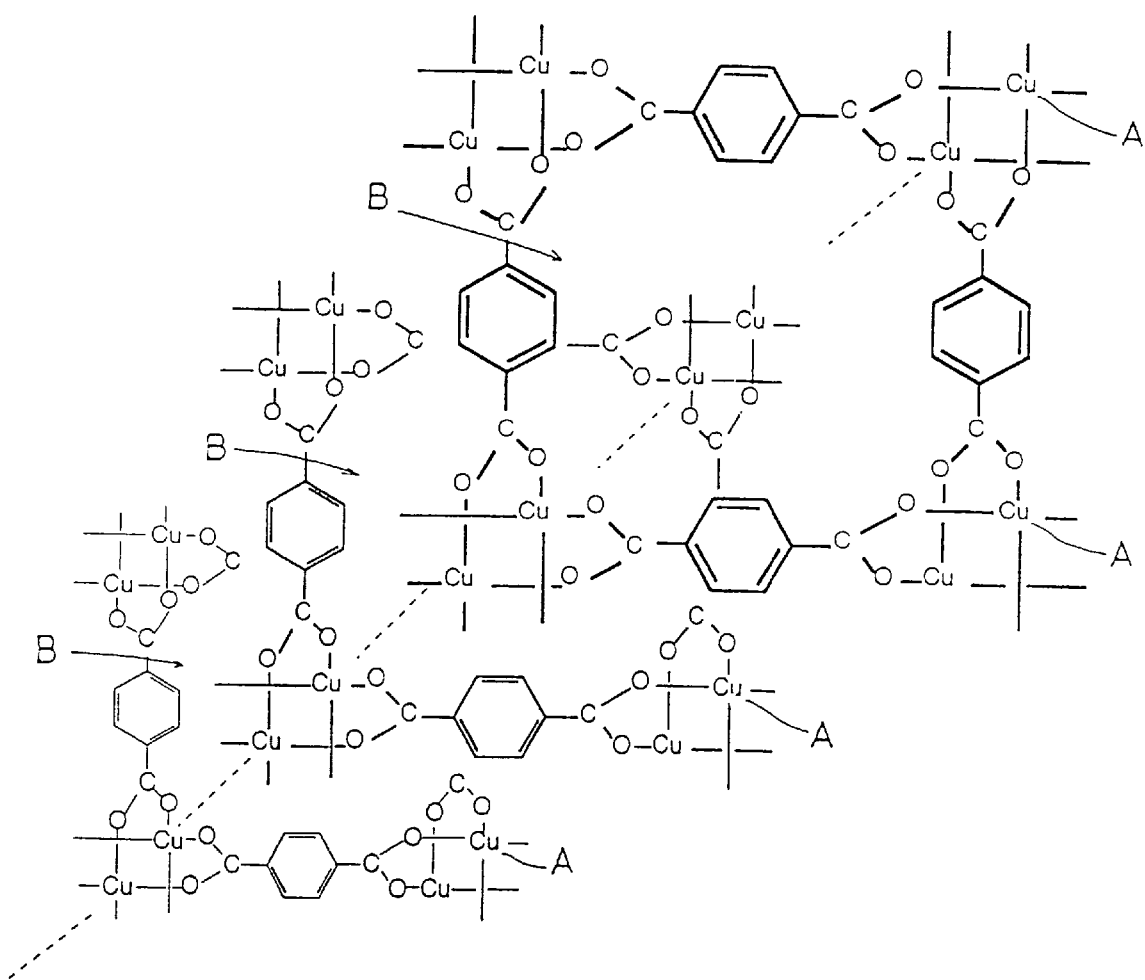
FIG. 2 is a schematic view showing an expected structure of a terephthalic acid copper complex.
Figure 3:
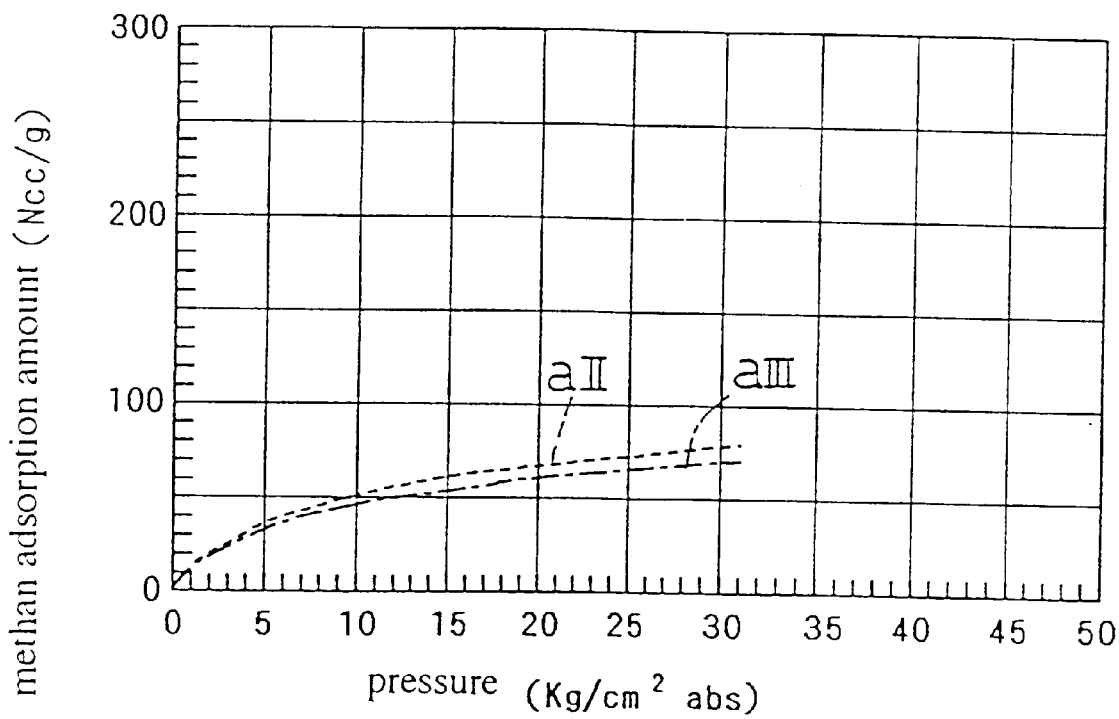
FIG. 3 is a graph showing the gas adsorption capacity (adsorption isotherm) of the terephthalic acid copper complex.
Figure 4:
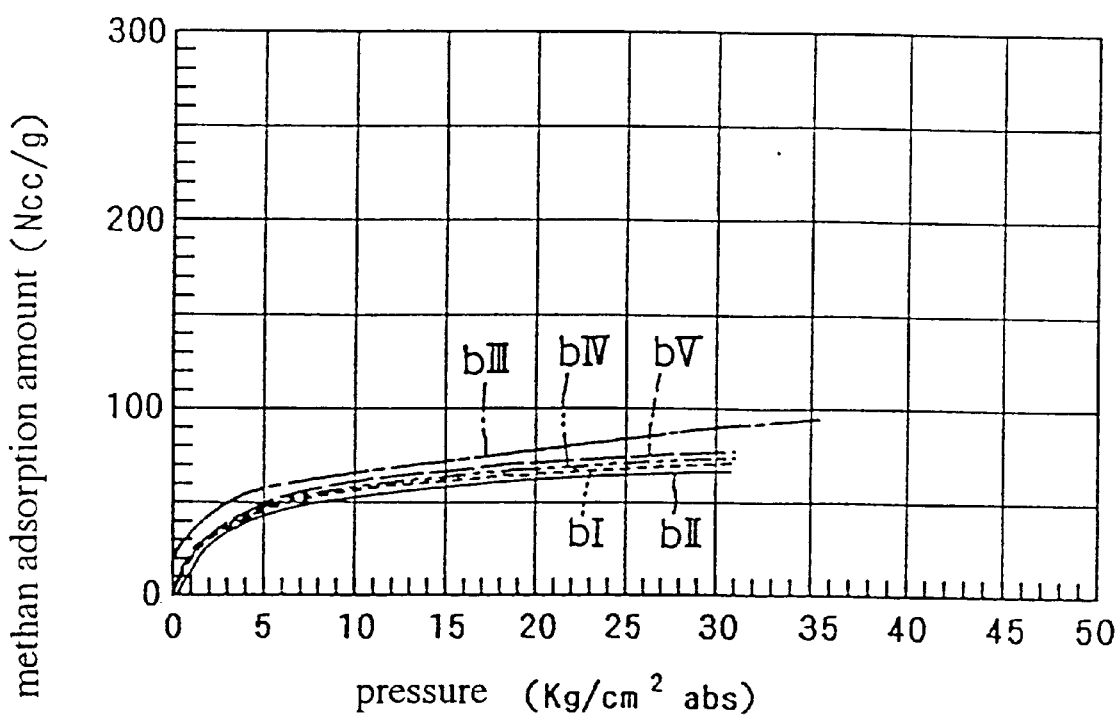
FIG. 4 is a graph showing the gas adsorption capacity (adsorption isotherm) of a fumaric acid copper complex.
Figure 5:
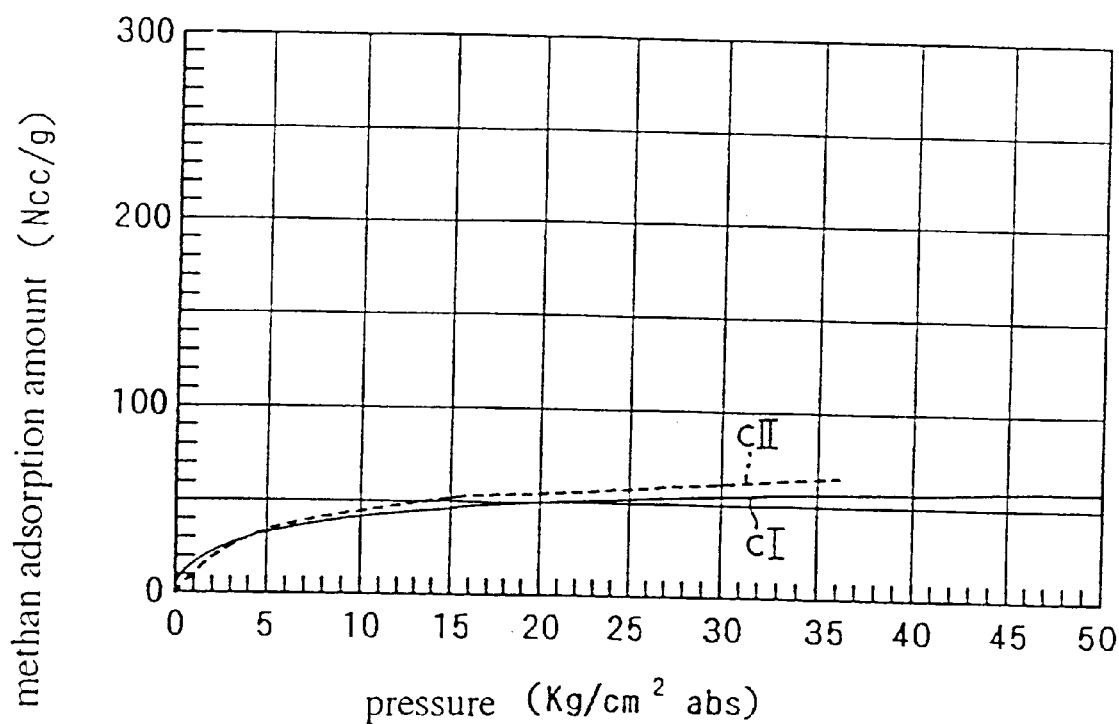
FIG. 5 is a graph showing the gas adsorption capacity (adsorption isotherm) of a 1,4-cyclohexane dicarboxylic acid copper complex.
Figure 6:
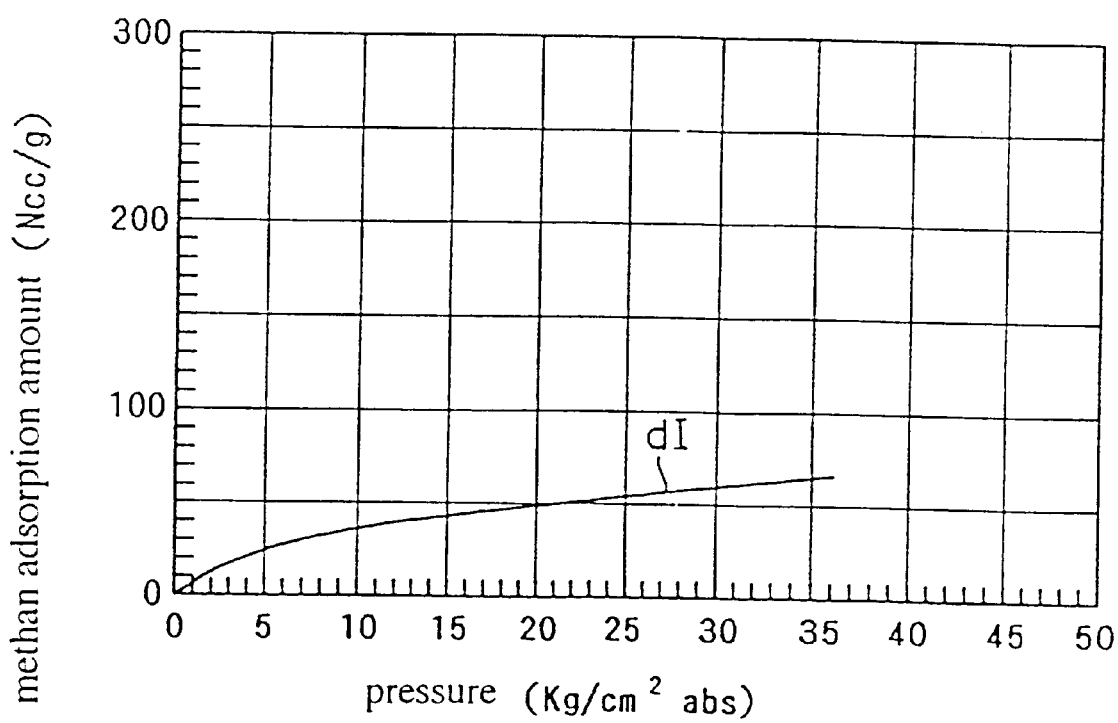
FIG. 6 is a graph showing the gas adsorption capacity (adsorption isotherm) of a naphthalene dicarboxylic acid copper complex.

The presence of the one-dimensional channel structure of the above-described complexes were confirmed by powder X-ray diffraction patterns and pore diameter distributions. And, from measurement of magnetic susceptibility, it was found that these complexes have a lattice-like two-dimensional structure in which a number of two-nucleus structures having dicarboxylic acids coordinated around a copper ion are bonded to each other through mutual bonding of their adjacent copper ions via the dicarboxylic acid, the copper ions being present at the crossing points A, A, A, . . . of the lattice. Further, a plurality of the above-described two-dimensional structures are considered to be crystallized in such a manner that the respective crossing points of the vertically stacked lattices are vertically aligned with gaps B, B . . . between the adjacent crossing points together forming a one-dimensional channel structure (for instance, FIG. 2 shows an expected structure of the terephthalic acid copper complex). Further, based on the above results, it may be understood that the pore diameter may be varied by changing the kind of the dicarboxylic acid to be employed.

(3) Characteristics of the Various Organometallic Complexes (3)-1 Pressure-dependency of Methane Gas Adsorption Amount On the organometallic complexes obtained through the above-described processes, their metal adsorbing amounts were measured in weight with the range of 0–30 Kg/cm² abs.

The results of the measurements are shown in FIGS. 3 through 7. In each of these figures, the horizontal axis represents the pressure (Kg/cm² abs), while the vertical axis represents the methane adsorption amount as measured at 25° C. (i.e. adsorption isotherm). Incidentally, in the figures, (1) of [a] is denoted as a1, and similar denotations are used for the others.

As shown, it was discovered that all of these dicarboxylic acid copper complexes adsorb methane under the pressurized, normal temperature (e.g. 25° C.) condition.

(3)-2 Molding-pressure Dependency of Methane Gas Adsorption Amount

In case the complex is used in a gas storage apparatus or a gaseous fuel automobile, the organometallic complex obtained as above is press-molded to obtain a predetermined value of molded density. Next, changes which occur in the adsorption characteristics due to such molding process will be described.

In the following description, with using activated carbon for comparison, molded densities of the respective press-molded, dicarboxylic acid copper complexes, i.e. the terephthalic acid copper complex acid [aI], the fumaric acid copper complex [bI], the cyclohexane dicarboxylic acid copper complex [cI] were studied. Incidentally, in studying the press-molding pressure dependency, two kinds of press-molding pressures of 650 Kg/cm² and 250 Kg/cm² were studied for comparison therebetween. However, as to the activated carbon, the press-molding at 650 Kg/cm² was not conducted.

Table 1 below shows charged densities of the respective substances without effecting the compression-molding and molded densities with effecting the compression-molding in comparison.

TABLE 1 densities of substances (g/cc)

| | charged density | molded density | |
|---|---|---|---|
| | | (650 Kg/cm²) | (250 Kg/cm²) |
| terephthalic acid copper | 0.51 | 1.53 | 1.38 |
| fumaric acid copper | 0.59 | 1.35 | 1.15 |
| cyclohexane dicarboxylic acid copper | 0.50 | 1.21 | 0.67 |
| activated carbon | 0.29 | — | 0.49 |

FIG. 8 shows changes in the gas adsorption capacities per unit volume due to the compression-molding of the terephthalic acid copper complex [aI], fumaric acid copper [bI] and of the activated carbon.

In this figure, the horizontal axis represents the pressure (Kg/cm² abs), and the vertical axis presents the methane adsorption amount per unit volume, respectively. Further, each graph represents the adsorbing-retaining materials identified below.

○: terephthalic acid copper [aI] without compression-molding;
●: terephthalic acid copper [aI] compression-molded at 250 Kg/cm²;
△: terephthalic acid copper[aI] compression-molded at 650 Kg/cm²;
▲: fumaric acid copper [bI] compression-molded at 650 Kg/cm²;
◇: activated carbon without compression-molding;
◆: activated carbon compression-molded at 250 Kg/cm²

As may be seen from this figure, the dicarboxylic acid complexes with the compression molding have high molded densities and achieve higher gas adsorption capacities in comparison with the activated carbon.

Now, in case the main adsorption target is methane, it is preferred that the organometallic complex have a specific surface area ranging between a few to 1500 m²/g, more preferably 50 to 1000 m²/g (can provide high adsorption capacity). And, if the specific surface area is smaller than a few m²/g, there occurs significant reduction in the adsorption capacity. Conversely, if the area is larger than 1,500 m²/g, there occurs reduction in the amount of complex obtained.

On the other hand, the pore diameter should preferably range between 3 and 13 Å, and more preferably between 5 and 12 Å. If the diameter is smaller than 3 Å, there occurs significant reduction in the adsorption capacity. Conversely, if the diameter is greater than 13 Å, there also occurs significant reduction in the adsorption capacity.

(3)-3: Temperature Dependency of Methane Gas Adsorption Amount

The present inventors studied on methane adsorption capacity of the fumaric acid copper at the temperature range of 5 to 60° C., for its application in a gaseous fuel automobile, in comparison with the activated carbon.

Figure 9:
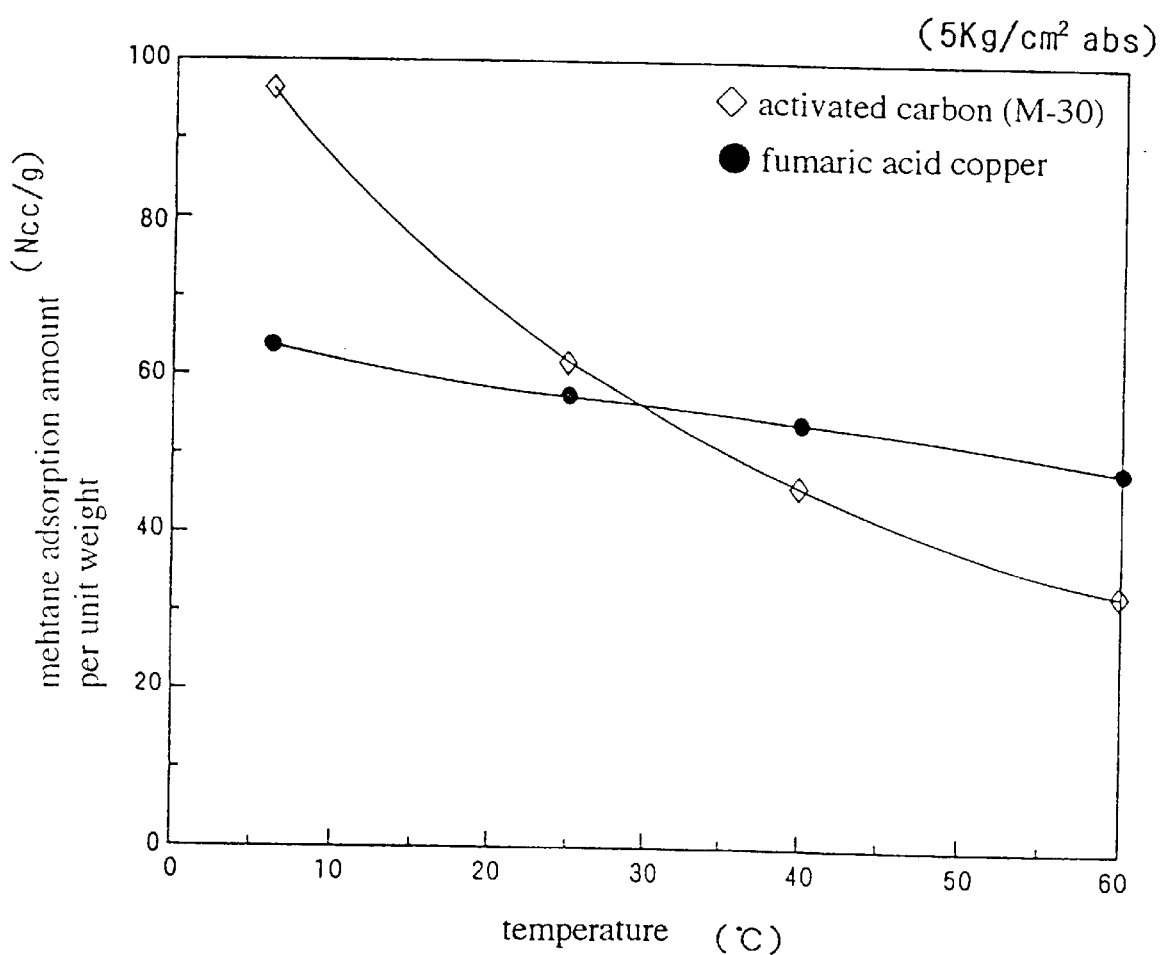
FIG. 9 is a graph showing in comparison the gas adsorption capacities (adsorption isobaric curves) per unit weight of the terephthalic acid copper complex and the activated carbon relative to the temperature.
Figure 10:
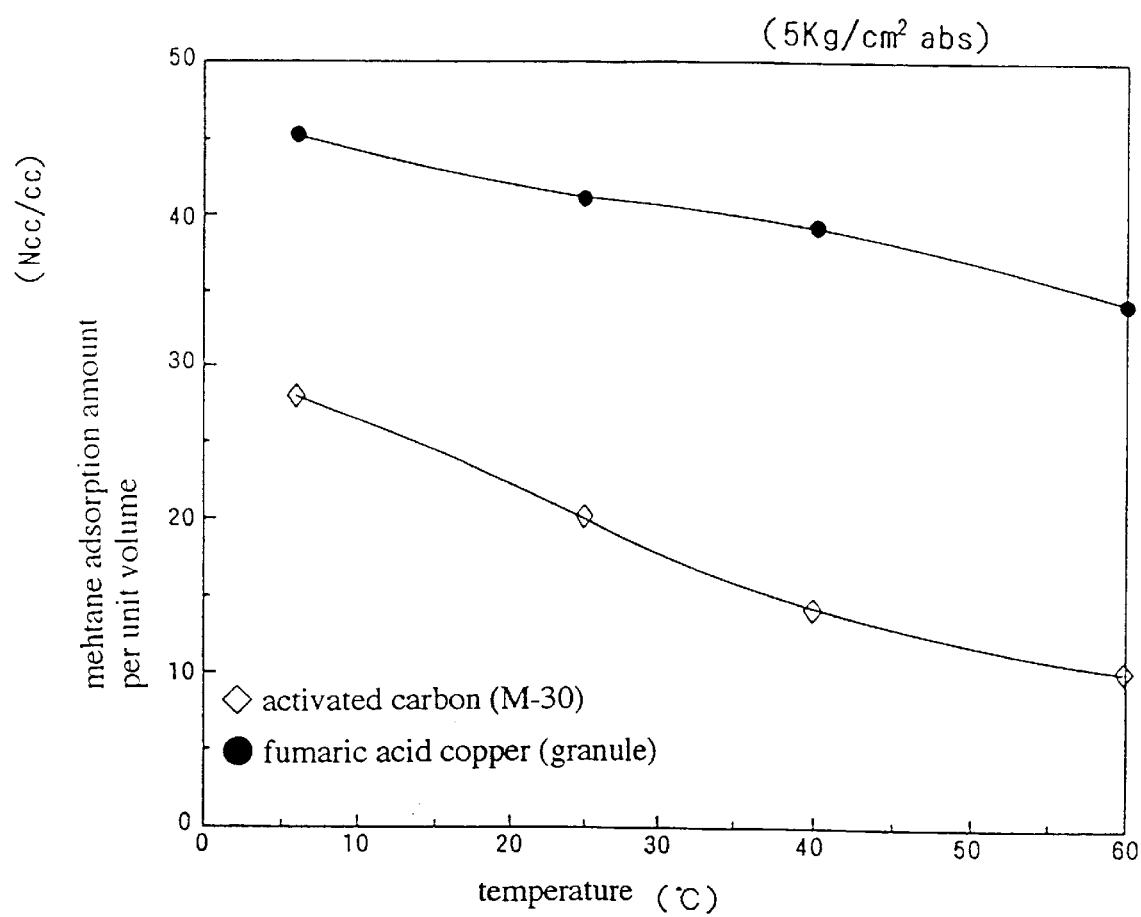
FIG. 10 is a graph showing in comparison the gas adsorption capacities (adsorption isobaric curves) per unit volume of the terephthalic acid copper complex and the activated carbon relative to the temperature.

The results of the study are shown in FIGS. 9 and 10. In each of these figures, the horizontal axis represents the temperature, while the vertical axis represents the methane adsorption amount. FIG. 9 shows the adsorption amounts per unit weight, while FIG. 10 shows the adsorption amounts per unit volume, respectively. Further, a mark ● denotes the results obtained with the fumaric acid copper, while a further mark ◇ denotes the results obtained with the activated carbon. In these, all these materials were provided in the form of powder.

As may be apparent from FIGS. 9 and 10, with rise in the temperature, the methane adsorption amounts decrease. However, the amount of decrease is smaller for the fumaric acid copper than for the activated carbon. Moreover, the fumaric acid copper originally has a higher volume adsorption capacity than the activated carbon. Hence, it may be understood that this material is highly useful.

That is, if this adsorbing-retaining agent is used in a gaseous fuel automobile, a large amount of e.g. ANG may be stored within a predetermined volume. Or, a same amount of gas may be stored within a smaller volume. Hence, this agent will be very useful for this application.

(3)-4: Adsorption Effects for Other Gas

There was studied if the dicarboxylic acid copper complexes described above exhibit adsorption capacity for other gas than methane gas.

(I) The hydrocarbon gas adsorption capacities of the terephthalic acid copper complex acid [aII], the fumaric acid copper complex [bIII] were studied. The results are shown in FIGS. 11 and 12.

Figure 11:
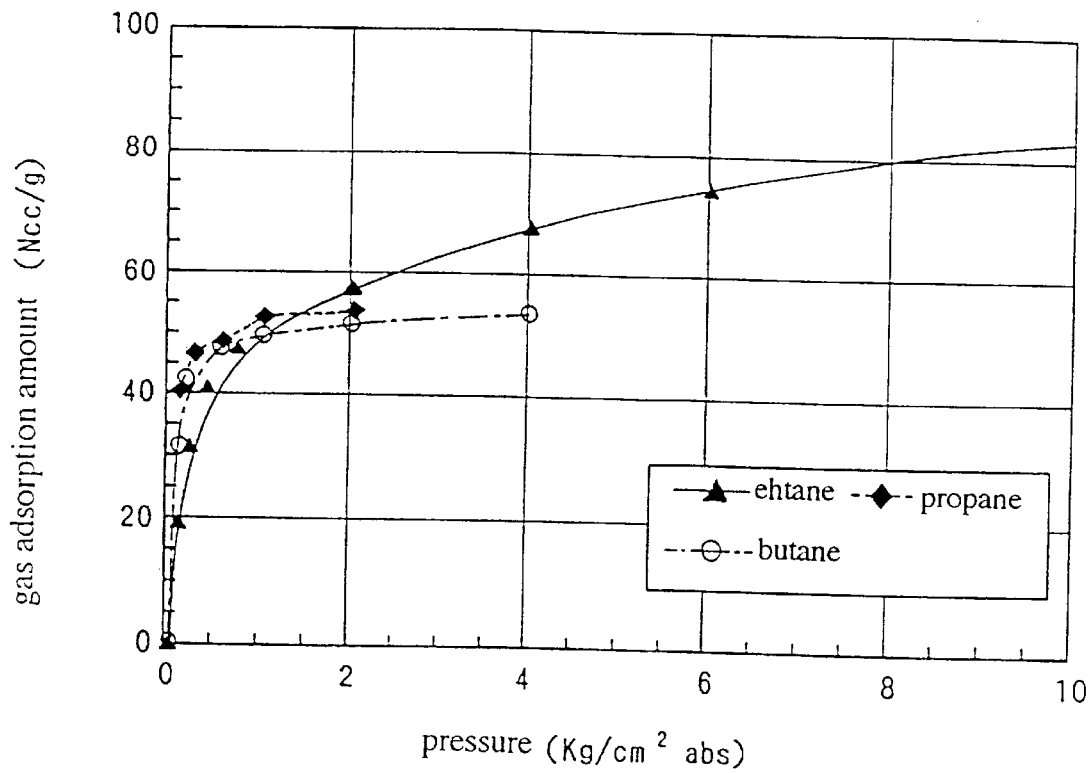
FIG. 11 is a graph showing the fuel gas adsorption capacity (adsorption isotherm) of the terephthalic acid copper complex.
Figure 12:
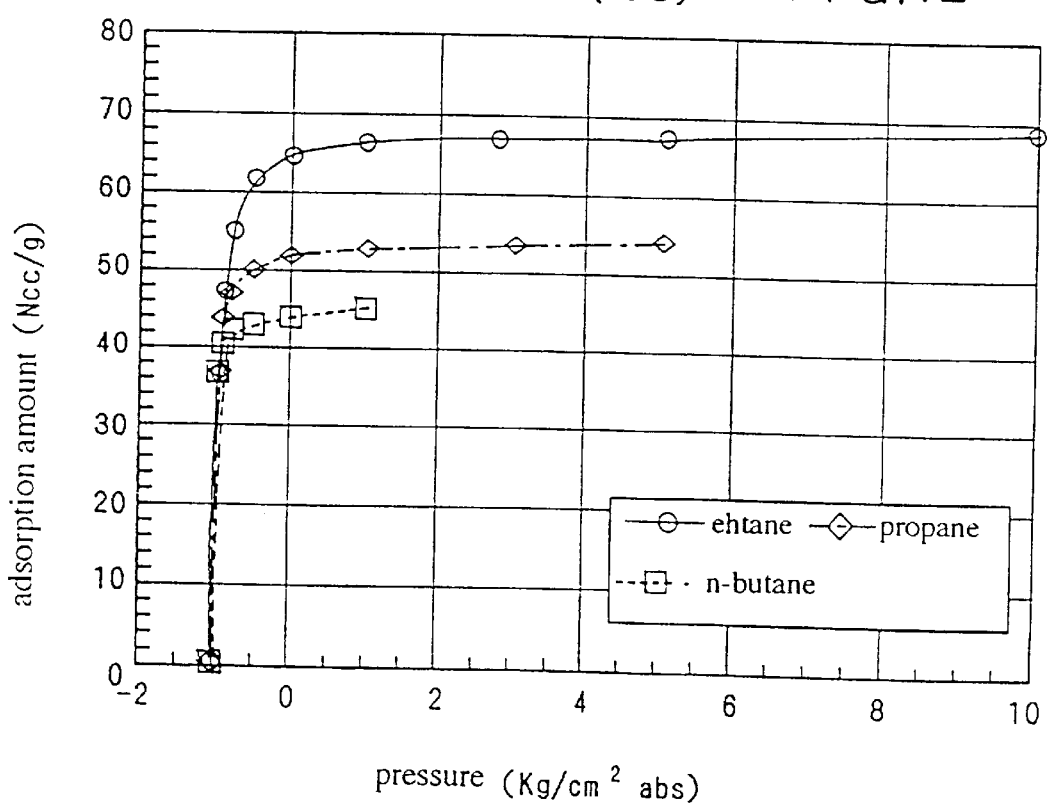
FIG. 12 is a graph showing the fuel gas adsorption capacity (adsorption isotherm) of the fumaric acid copper complex.

As may be seen from FIG. 11 and FIG. 12, it was found that the dicarboxylic acid copper complexes exhibit high gas adsorption capacities for fuel gases in general.

(II) Further, the oxygen and nitrogen gas adsorption capacities of the fumaric acid copper complex [bV] were studied. The results are shown in FIG. 13.

Figure 13:
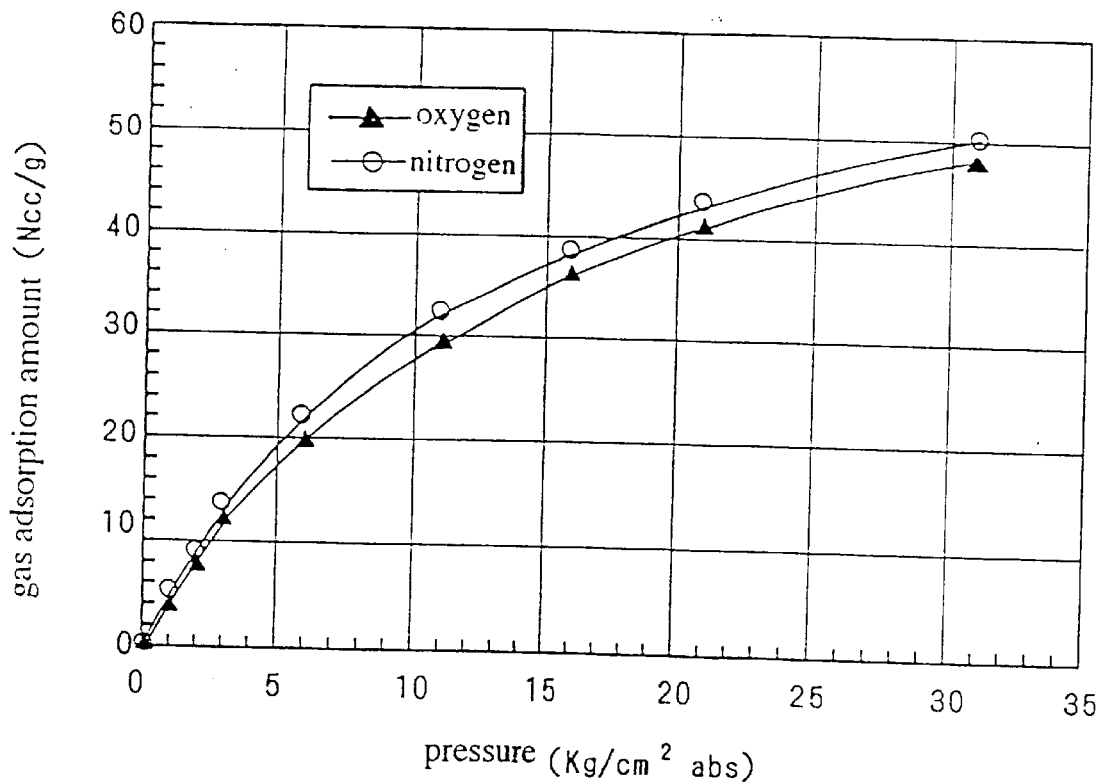
FIG. 13 is a graph showing the gas adsorption capacity (adsorption isotherm) for further gas of the fumaric acid copper complex.

As may be seen from this FIG. 13, it was found that this dicarboxylic acid copper complex can adsorb the various gases regardless of kind.

Figure 17:
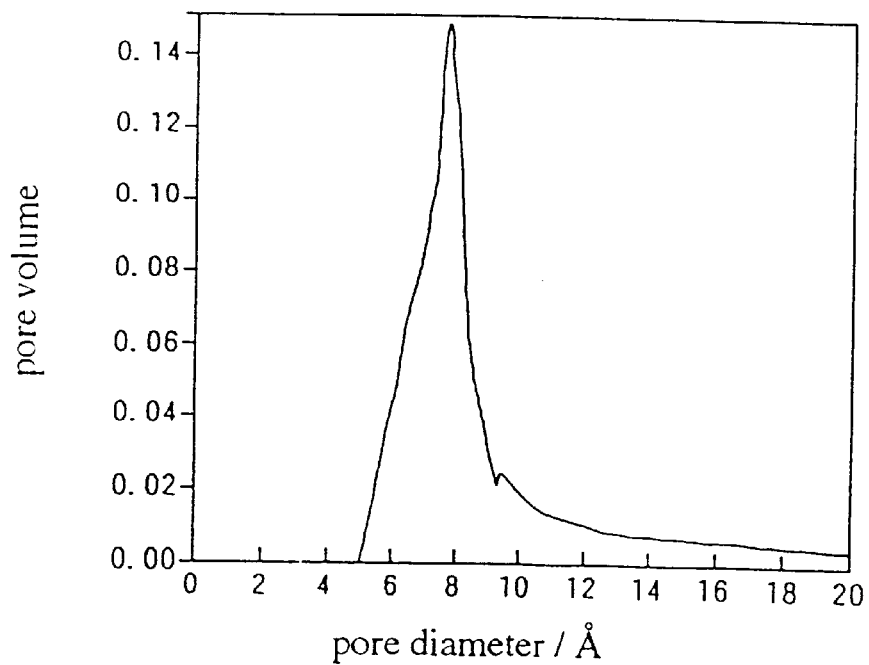
FIG. 17 is a graph showing pore diameter distribution of the 4, 4'-biphenyl dicarboxylic acid copper complex.
Figure 18:
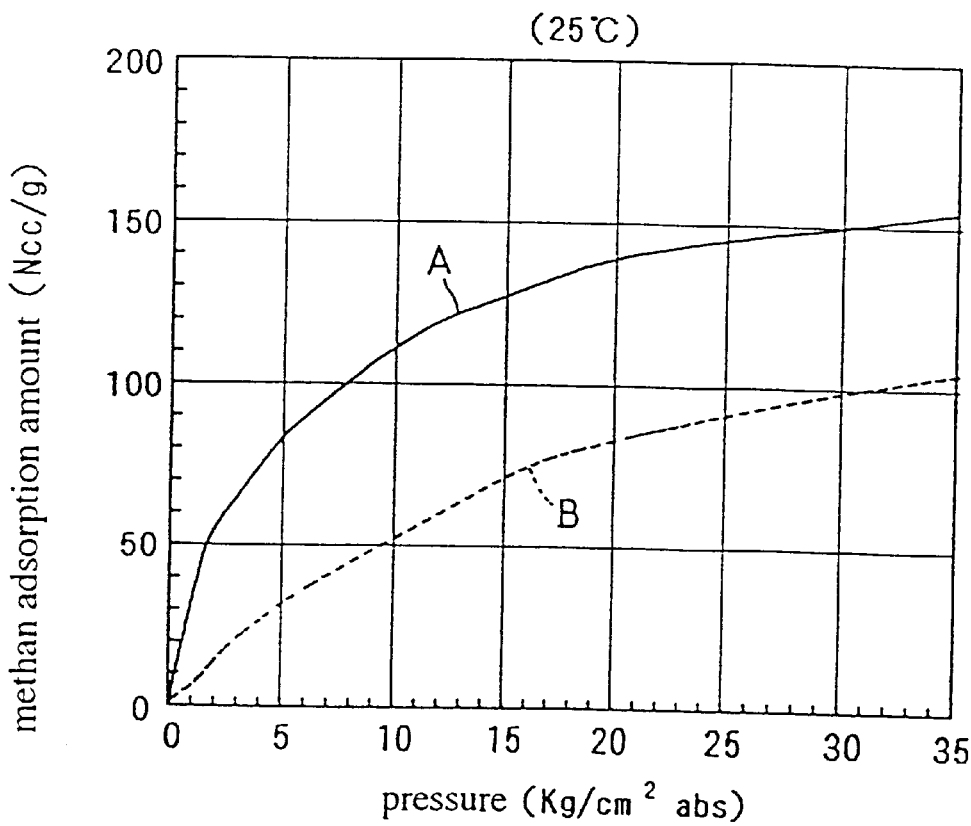
FIG. 18 is a methane adsorption capacity (adsorption isotherm) of the 4, 4'-biphenyl dicarboxylic acid copper complex.

(3)-5 Characteristics of 4, 4'-biphenyl Dicarboxylic Acid Copper a: The specific surface area of the 4, 4'-biphenyl dicarboxylic acid copper complex synthesized in the foregoing [f] A by the BET method. The study showed that the complex had the area of 900 m²/g.

b: The average pore diameter of the 4, 4'-biphenyl dicarboxylic acid copper complex synthesized in the foregoing [f] A by the HK method. The study showed that the complex had the diameter of 7.8 Å (see FIG. 17).

c: The methane gas adsorption-retention amount of the 4, 4'-biphenyl dicarboxylic acid copper complex was studied. The result is shown in FIG. 18.

That is, it was discovered that this 4, 4'-biphenyl dicarboxylic acid copper complex can adsorb and retain methane gas under the pressurized condition and therefore can be effectively used as a methane gas adsorbing-retaining agent.

d: The adsorption and retention amounts of the 4, 4'-biphenyl dicarboxylic acid copper complex synthesized in the foregoing [f] with respect to ethane, propane and butane gases were studied. method. The results are shown in FIGS. 19(a) and (b).

Figure 20:
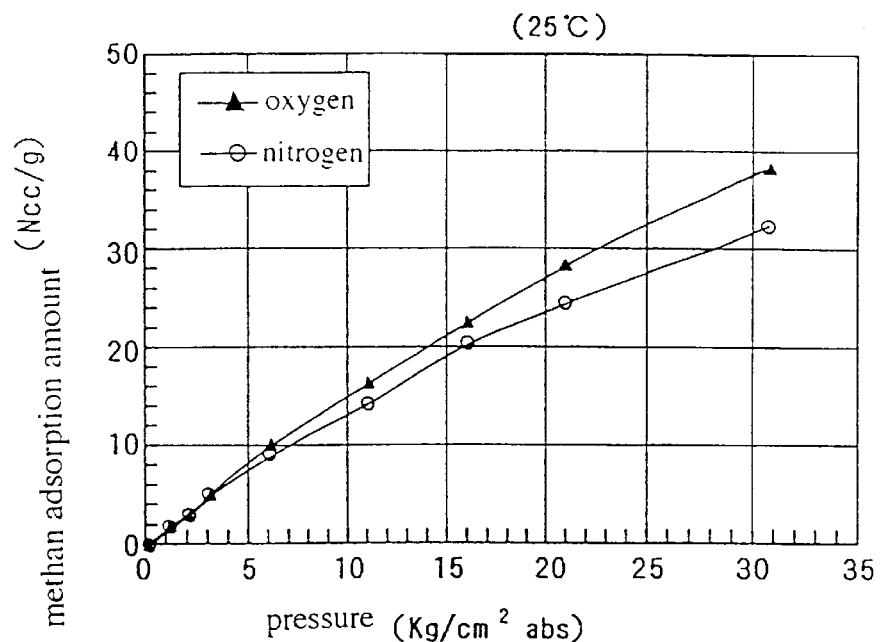
FIG. 20 is a graph showing oxygen and nitrogen gas adsorption capacities (adsorption isotherms) of the 4, 4'-biphenyl dicarboxylic acid copper complex.

That is, it was discovered that this 4, 4'-biphenyl dicarboxylic acid copper complex can adsorb and retain various gases under the pressurized condition and therefore can be effectively used as a fuel gas adsorbing-retaining agent for use in a fuel storage tank employed in a gaseous fuel automobile or the like.

e. Further, the adsorbing effects with respect to oxygen and nitrogen were also studied. The results are shown in FIG. 20. As shown, in addition to the fuel gas, the complex can effectively adsorb and retain various gases as the gases enter its one-dimensional channel structure to be retained thereat. Thus, by causing the 4, 4'-biphenyl dicarboxylic acid copper complex to support various catalysts, it may be expected that the complex provides catalytic reaction to the various gases introduced therein.

(4) Other Dicarboxylic Acid Metal Complexes (4)-1: Specific Examples of Synthesis a. fumaric acid molybdenum 0.597 g (5.14 mmol) of fumaric acid and 1,000 g (2.34 mmol) of molybdenum acetate were dissolved in 900 ml of methanol. After this was stirred for three days at the room temperature, this was kept still for a few days. Thereafter, its precipitation product was suction-filtered, rinsed sufficiently with methanol and then vacuum-dried for 60° C./4 hours, whereby 0.970 g of target substance was obtained. This substance had the specific surface area of 469 $m^2/g$. And, a measurement according to the HK method using argon revealed that the substance had the pore diameter of 5.8 Å.

b. terephthalic acid molybdenum 0.854 g (5.14 mmol) of terephthalic acid and 1,000 g (2.34 mmol) of molybdenum acetate were dissolved in 900 ml of methanol. After this was stirred for three days at the room temperature, this was kept still for a few days. Thereafter, its precipitation product was suction-filtered, rinsed sufficiently with methanol and then vacuum-dried for 60° C./4 hours, whereby 1.387 g of target substance was obtained. This substance had the specific surface area of 519 $m^2/g$. And, a measurement according to the HK method using argon revealed that the substance had the pore diameter of 5.7 Å.

c. cyclohexane dicarboxylic acid molybdenum 0.885 g (5.14 mmol) of cyclohexane dicarboxylic acid and 1,000 g (2.34 mmol) of molybdenum acetate were dissolved in 900 ml of methanol. After this was stirred for three days at the room temperature, this was kept still for a few days. Thereafter, its precipitation product was suction-filtered, rinsed sufficiently with methanol and then vacuum-dried for 60° C./4 hours, whereby 1.216 g of target substance was obtained. This substance had the specific surface area of 212 $m^2/g$. And, a measurement according to the HK method using argon revealed that the substance had the pore diameter of 5.2 Å.

d. fumaric acid chrome 0.597 g (5.14 mmol) of fumaric acid and 0.880 g (2.34 mmol) of chrome acetate (II) were dissolved in 900 ml of methanol. After this was stirred for three days at the room temperature, this was kept still for a few days. Thereafter, its precipitation product was suction-filtered, rinsed sufficiently with methanol and then vacuum-dried for 60° C./4 hours, whereby 0.805 g of target substance was obtained. This substance had the specific surface area of 183 $m^2/g$. And, a measurement according to the HK method using argon revealed that the substance had the pore diameter of 5.0 Å.

e. 1, 4-trans-cyclohexane dicarboxylic acid rhodium 0.885 g (5.14 mmol) of 1, 4-trans-cyclohexane dicarboxylic acid acid and 0.517 g (1.17 mmol) of rhodium acetate dimer ($Rh_2(CH_3COO)_4$) were dissolved in 900 ml of methanol. After this was stirred for three days at the room temperature, this was kept still for a few days. Thereafter, its precipitation product was suction-filtered, rinsed sufficiently with methanol and then vacuum-dried for 60° C./4 hours, whereby 0.824 g of target substance was obtained.

(4)-2: Pressure Dependency of Methane Gas Adsorption Amount

On some of the organometallic complexes obtained through the above-described processes, their methane adsorbing amounts were measured in weight with the range of 0–36 $Kg/cm^2$ abs.

Figure 21:
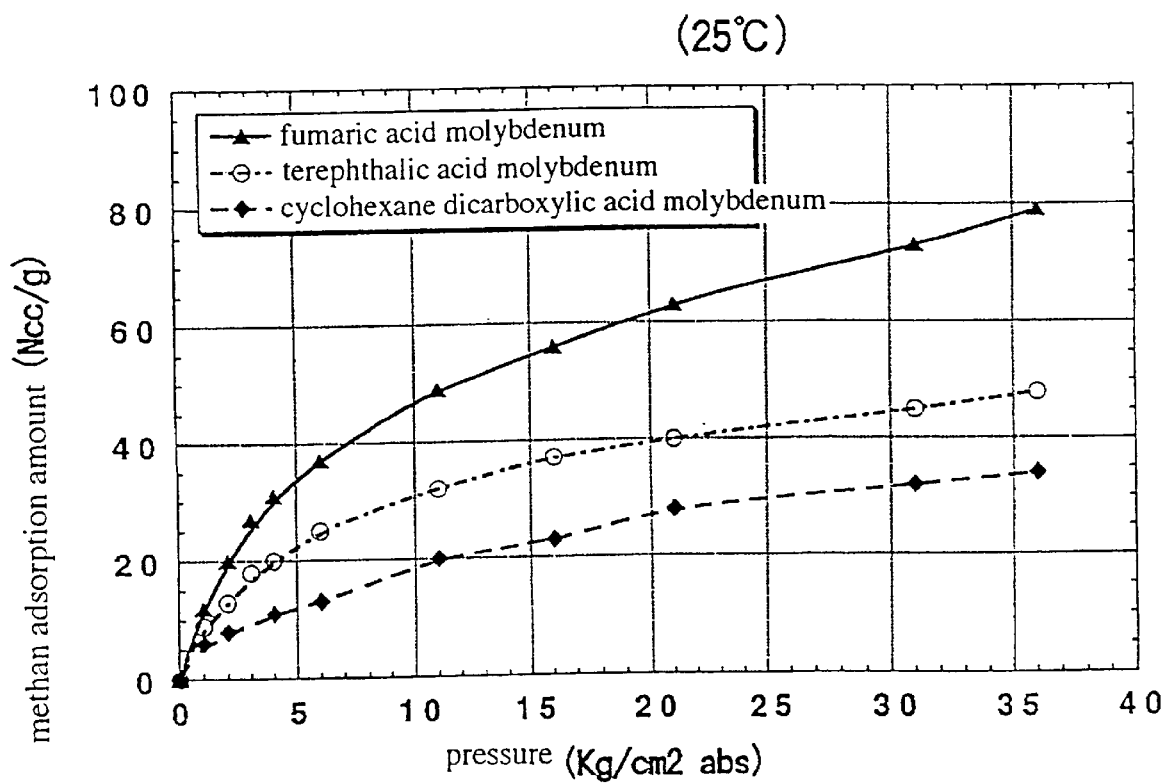
FIG. 21 is a graph showing methane adsorption capacities of fumaric acid molybdenum, terephthalic acid molybdenum, and cyclohexane dicarboxylic acid molybdenum, respectively.

The results of the measurements are shown in FIG. 21. In the figure, ▲ graphically denotes the fumaric acid molybdenum, ○ graphically denotes terephthalic acid molybdenum, and ◆ graphically denotes 1, 4-trans-cyclohexane dicarboxylic acid molybdenum, respectively. And, the horizontal axis represents the pressure ($Kg/cm^2$ abs), while the vertical axis represents the methane adsorption amount as measured at 25° C. (i.e. adsorption isotherm).

As shown, it was discovered that all of these organometallic complexes exhibited good methane adsorption characteristics.

Substantially similar results were obtained with respect to 4, 4'-biphenyl dicarboxylic acid molybdenum, terephthalic acid chrome, fumaric acid chrome, 1,4-trans-cyclohexane dicarboxylic acid chrome, biphenyl dicarboxylic acid chrome, terephthalic acid rhodium, biphenyl dicarboxylic acid rhodium, terephthalic acid palladium, fumaric acid palladium, 1,4-trans-cyclohexane dicarboxylic acid palladium, biphenyl dicarboxylic acid palladium, terephthalic acid tungsten, fumaric acid tungsten, 1,4-trans-cyclohexane dicarboxylic acid tungsten, and biphenyl dicarboxylic acid tungsten. But, these results are not shown.

Further, methane adsorption characteristics superior to that of the activated carbon were confirmed with dicarboxylic tungsten and dicarboxylic palladium.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A methane adsorbing-retaining agent, wherein said agent is obtained by mixing dicarboxylic acid dissolved in an organic solvent with a solution containing at least one salt of copper, molybdenum, chrome, rhodium, tungsten and palladium and wherein the agent comprises, as a main component thereof, an organometallic complex having a one-dimensional channel structure.

2. A methane adsorbing-retaining agent as defined in claim 1, wherein said organometallic complex is obtained by mixing the dicarboxylic acid dissolved in the organic solvent with a solution containing at least one salt selected from the group consisting of salt of copper, molybdenum, chrome, rhodium, tungsten and of palladium.

3. A methane adsorbing-retaining agent as defined in claim 2, wherein said solution containing the copper salt comprises at least one kind of solution selected from the group consisting of formatic acid copper, copper sulfate, copper nitrate and copper carbonate.

4. A methane adsorbing-retaining agent as defined in claim 1, wherein said organometallic complex comprises a biphenyl dicarboxylic acid copper complex obtained by mixing biphenyl dicarboxylic acid solution with a further solution containing a bivalent copper salt.

5. A methane adsorbing-retaining agent as defined in claim 4, wherein said copper salt comprises at least one of copper sulfate, copper nitrate, and copper carbonate.

6. A biphenyl dicarboxylic acid copper complex obtained by mixing biphenyl dicarboxylic acid solution with a further solution containing a bivalent copper salt.

7. A biphenyl dicarboxylic acid copper complex as defined in claim 6, wherein said biphenyl dicarboxylic acid solution is added with an additive comprising an organic acid.

8. A biphenyl dicarboxylic acid copper complex as defined in claim 7, wherein said organic acid comprises at least one of formic acid, acetate, trifluoro acetate, and propionic acid.

9. A biphenyl dicarboxylic acid copper complex as defined in claim 6, wherein said copper salt comprises at least one of copper sulfate, copper nitrate, and copper carbonate.

10. A biphenyl dicarboxylic acid copper complex as defined in claim 7, wherein said copper salt comprises at least one of copper formate and copper acetate.

11. A biphenyl dicarboxylic acid copper complex as defined in claim 6, wherein a solvent of said solution containing said copper salt comprises at least one organic solvent selected from the group consisting of methanol, ethanol, propanol, benzene, toluene, acetonitrile, tetrahydrofuran, dimethylsulfoxide, dimethylformamide, dimethylacetoamido, hexane, and acetone.

12. A biphenyl dicarboxylic acid copper complex as defined in claim 6, wherein said biphenyl dicarboxylic acid comprises 4,4'-biphenyl dicarboxylic acid.

* * * * *